United States Patent
Li et al.

(10) Patent No.: US 11,466,152 B2
(45) Date of Patent: Oct. 11, 2022

(54) ETHER AMINE COMPOSITIONS AND COATINGS

(71) Applicant: Angus Chemical Company, Buffalo Grove, IL (US)

(72) Inventors: Chunzhao Li, Vernon Hills, IL (US); G. David Green, Cary, IL (US)

(73) Assignee: ANGUS CHEMICAL COMPANY, Buffalo Grove, IL (US)

( * ) Notice: Subject to any disclaimer, the term of this patent is extended or adjusted under 35 U.S.C. 154(b) by 275 days.

(21) Appl. No.: 16/612,694

(22) PCT Filed: May 11, 2018

(86) PCT No.: PCT/US2018/032409
§ 371 (c)(1),
(2) Date: Nov. 11, 2019

(87) PCT Pub. No.: WO2018/209292
PCT Pub. Date: Nov. 15, 2018

(65) Prior Publication Data
US 2020/0062956 A1    Feb. 27, 2020

Related U.S. Application Data

(60) Provisional application No. 62/505,414, filed on May 12, 2017.

(51) Int. Cl.
| | |
|---|---|
| *C08L 67/02* | (2006.01) |
| *C08K 5/00* | (2006.01) |
| *C08K 5/09* | (2006.01) |
| *C08K 5/17* | (2006.01) |
| *C09D 5/02* | (2006.01) |
| *C09D 5/44* | (2006.01) |

(52) U.S. Cl.
CPC ............ *C08L 67/02* (2013.01); *C08K 5/0025* (2013.01); *C08K 5/09* (2013.01); *C08K 5/17* (2013.01); *C09D 5/022* (2013.01); *C09D 5/4453* (2013.01); *C08L 2203/16* (2013.01)

(58) Field of Classification Search
CPC ....... C08L 67/02; C08L 2203/16; C08K 5/17; C08K 5/09; C08K 5/0025; C09D 5/022; C09D 5/4453
USPC ..................................................... 428/474.4
See application file for complete search history.

(56) References Cited

U.S. PATENT DOCUMENTS

| | | | |
|---|---|---|---|
| 5,618,340 A | 4/1997 | Krogh et al. | |
| 2015/0166823 A1* | 6/2015 | Huybrechts | C08G 18/6254 524/558 |

FOREIGN PATENT DOCUMENTS

| | | |
|---|---|---|
| CN | 1483772 A | 3/2004 |
| CN | 101514271 A | 8/2009 |
| CN | 101775109 A | 7/2010 |
| CN | 103153942 A | 6/2013 |
| CN | 105567050 A | 5/2016 |
| CN | 106243272 A | 12/2016 |
| CN | 107502093 A | 12/2017 |
| JP | S62-283153 | 12/1987 |
| WO | WO2009/051961 | 4/2009 |

OTHER PUBLICATIONS

Foreign Action other than Search Report on CN 201880037839.9 dated Mar. 26, 2021.
International Preliminary Report on Patentability on PCT/US2018/032409 dated Nov. 21, 2019 (6 pages).
International Search Report and Written Opinion on PCT/US2018/032409 dated Sep. 7, 2018 (7 pages).
International Preliminary Report on Patentability re Application No. PCT/US2018/032409; 5 pages.
International Search Report and Written Opinion re Application No. PCT/US2018/032409; 7 pages.
Notice of Reasons for Rejection on JP 2019-562383 dated Dec. 23, 2021 (including English translation).

* cited by examiner

*Primary Examiner* — Hui H Chin
(74) *Attorney, Agent, or Firm* — Foley & Lardner LLP

(57) ABSTRACT

The present technology relates generally to aqueous dispersion or emulsion compositions that include a polymeric binder resin and an ether amine. Specifically, the polymeric binder resin includes acid functional groups, at least a portion of which are neutralized by the ether amine such that the polymeric binder resin is dissolved or dispersed in the water, provided that the polymeric binder resin is not a polyurethane and the ether amine is a compound of formula I: wherein $R^1$ and $R^2$ are independently $C^1$-$C^4$ alkyl or $C^3$-$C^4$ cycloalkyl group; or $R^1$ and $R^2$, together with the nitrogen to which they are attached, form a $C^4$-$C^5$ membered heterocycloalkyl ring; A is a $C^1$-$C^6$ alkylene or $C^1$-$C^6$ cycloalkylene ring; and $R^3$ is $C^1$-$C^4$ alkyl or $C^3$-$C^4$ cycloalkyl group; provided that the compound of formula I contains no more than 10 carbons.

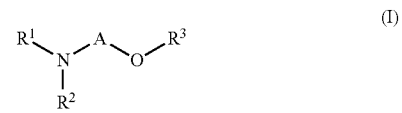

(I)

20 Claims, 5 Drawing Sheets

ETHER AMINE COMPOSITIONS AND COATINGS

CROSS-REFERENCE TO RELATED PATENT APPLICATIONS

This application claims the benefit of PCT Priority Application PCT/US2018/032409, filed on May 11, 2018, which claims the benefit of U.S. Patent Application No. 62/505,414, filed on May 12, 2017, the contents of which are incorporated herein by reference in their entireties for any and all purposes.

TECHNICAL FIELD

The present technology provides ether amines and compositions containing ether amines. These compositions may be used in industrial coatings and automotive coatings as well as inks and adhesives.

BACKGROUND

Water-based industrial coating compositions typically use water reducible or water dispersible polymers as binders in the aqueous composition. These polymers contain acid functional groups that require at least partial neutralization in order for the polymers to be solubilized or dispersed and subsequently function as binders.

Binders can be categorized according to their mechanisms for film formation (i.e., curing). Physical coalescence mechanisms include drying and coalescence. Drying refers to simple evaporation of the solvent or thinner to leave a coherent film behind. Coalescence refers to actual interpenetration (e.g., tangling) and fusion of formerly discrete particles. In contrast, chemical curing mechanisms involve chemical reaction(s) among the polymers that make up the binder.

SUMMARY

The present technology provides ether amine compounds as well as compositions, including coatings, inks, and adhesives that incorporate the ether amine compounds. In paint and other coating compositions, the ether amine compounds provide efficient neutralization, dispersion or emulsion stability, and/or quick/easy removal from the composition. In certain compositions, the present compounds may further enhance one or more of the following properties: corrosion resistance, scrub resistance, blocking resistance, co-dispersion, gloss enhancement, color acceptance and stability, reduced yellowing, aging stability, solvent and water resistance, washability, stain resistance, low temperature coalescence, and microbial control. Some compositions containing the present ether amine compounds also exhibit reduced curing temperatures, reduced curing times, enhanced hardness, enhanced solvent resistance, and/or other favorable properties compared to commercial amine neutralizers such as dimethylethanolamine ("DMEA"), triethylamine ("TEA"), and ammonium hydroxide.

In one aspect, there are provided ether amine compounds of formula I:

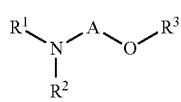

Formula I wherein $R^1$ and $R^2$ may independently be a $C_1$-$C_4$ alkyl or $C_3$-$C_4$ cycloalkyl group; or $R^1$ and $R^2$, together with the nitrogen to which they are attached, may form a $C_4$-$C_5$ member heterocycloalkyl ring; A may be a $C_2$-$C_6$ alkylene or $C_3$-$C_6$ cycloalkylene group; and $R^3$ may be $C_1$-$C_4$ alkyl or $C_3$-$C_4$ cycloalkyl group; provided that the compound of formula I contains no more than 10 carbons.

In a further aspect, compositions are provided that include the ether amine compound, a polymeric binder resin, and water, provided that the polymeric binder resin is not a polyurethane. The polymeric binder resin contains acid functional groups of which at least a portion are neutralized by the ether amine compound. In some embodiments, the polymeric binder resin (i.e., binder) may be dissolved or dispersed in the composition. In some embodiments, the composition may be an aqueous dispersion or emulsion. In some embodiments, the composition may further include a crosslinking agent, which reacts with the binder to form a final crosslinked binder. In a further aspect, the present technology provides coatings of the compositions described herein. Additionally, the present technology provides methods of curing or drying (including coalescing) the compositions described herein.

DETAILED DESCRIPTION

Figure 1A:
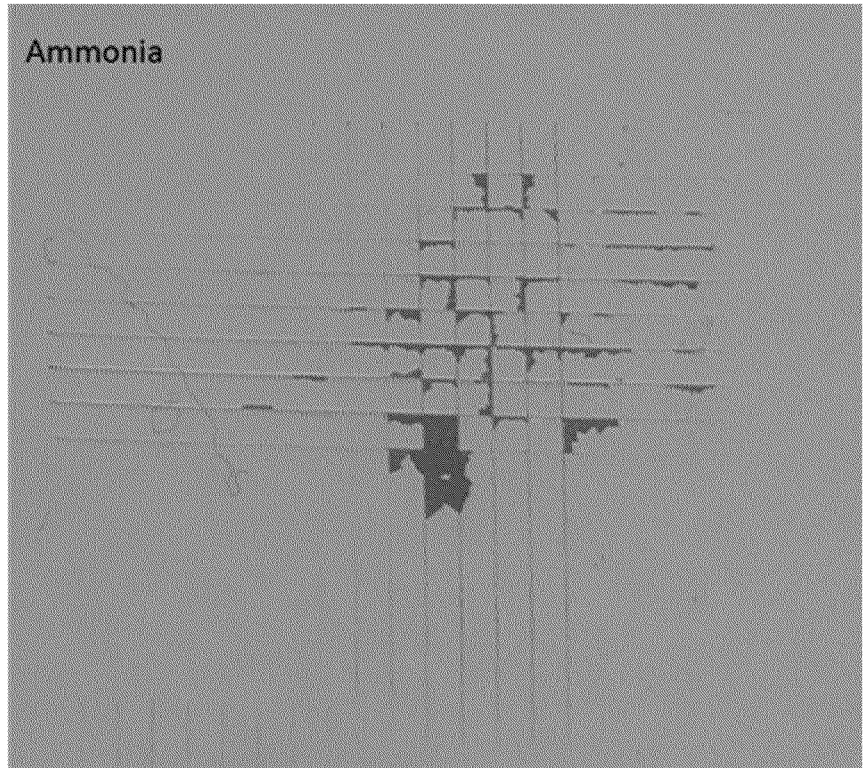
FIGS. 1A-1C provide the cross-hatch adhesion test result of latex binder compositions with the neutralizer ammonia (FIG. 1A), DMMOPA (FIG. 1B), or DMAMP (FIG. 1C).

The following terms are used throughout as defined below.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The term "alkyl" refers to a group, whether alone or as part of another group (e.g., in dialkylamino), encompasses straight and branched chain aliphatic groups (i.e., saturated hydrocarbyl chains), and, unless otherwise indicated, has 1-10, alternatively 1-8, or alternatively 1-6 alkyl carbon atoms. Preferred alkyl groups include, without limitation, methyl, ethyl, propyl, isopropyl, butyl, isobutyl, sec-butyl, tert-butyl, pentyl, and hexyl. Unless otherwise indicated, the alkyl group is optionally substituted with 1, 2, or 3, preferably 1 or 2, more preferably 1, substituents that are compatible with the compounds, monomers, and polymers described herein. In some embodiments, the alkyl group is unsubstituted.

The term "alkoxy" refers to a group in which an oxygen attached to a saturated straight or branched chain alkyl group. Unless otherwise indicated, the alkoxy group contains 1 to 6 carbon atoms (e.g. methoxy, ethoxy, n-propoxy, iso-propoxy, n-butoxy, iso-butoxy, sec-butoxy, tert-butoxy, n-pentoxy, neopentyloxy, iso-pentyloxy, n-hexyloxy or iso-hexyloxy), and preferably 1 to 4 carbon atoms. Representative examples of preferred alkoxy groups include methoxy, ethoxy, n-propoxy, iso-propoxy, n-butoxy, iso-butoxy, sec-butoxy and tert-butoxy. In some embodiments, the alkoxy group is unsubstituted.

The term "cycloalkyl" refers to saturated cyclic hydrocarbon groups. Unless otherwise indicated, the cycloalkyl group has 3 to 12 ring carbon atoms, alternatively 3 to 8 ring carbon atoms, or alternatively 3 to 6 ring carbon atoms. Preferred cycloalkyl groups include, without limitation, cyclopropyl, cyclobutyl, cyclopentyl, cyclopentenyl, and cyclohexyl. Unless otherwise indicated, the cycloalkyl group is optionally substituted with 1, 2, or 3, preferably 1 or 2, more preferably 1 alkyl group. In some embodiments, the alkyl group may include 1-6 carbon atoms, preferably the alkyl group is unsubstituted and includes 1-4 carbon atoms. In some embodiments, the cycloalkyl group is unsubstituted.

The term "heterocycloalkyl" as used herein refers to non-aromatic ring compounds containing 5 or more ring members, of which at least three are carbon atoms and at least one is a nitrogen atom. In some embodiments, the heterocyclyl group contains 1 or 2 heteroatoms. In some embodiments, the heterocyclyl group may include at least 4 or at least 5 carbon atoms. Typically, the heterocycloalkyl group is unsubstituted.

Groups described herein having two or more points of attachment (i.e., divalent, trivalent, or polyvalent) within the compound of the present technology are designated by use of the suffix, "ene." For example, divalent alkyl groups are alkylene groups, divalent cycloalkyl groups are cycloalkylene groups, and so forth. Substituted groups having a single point of attachment to the compound of the present technology are not referred to using the "ene" designation. Thus, e.g., chloroethyl is not referred to herein as chloroethylene.

In general, "substituted" refers to an alkyl group, as defined above in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. In some embodiments, a substituted group is substituted with 1, 2, or 3 substituents. Examples of substituent groups include, but are not limited to, hydroxyl, amino, thiol, nitro, halo, ester, amido, carbonyl, or carboxylic acid. Unless otherwise indicated, the foregoing substituent groups are not themselves further substituted.

Unless stated otherwise, all the molecular weight (i.e., molar mass) data, number-average molecular weight data Mn or weight-average molecular weight data Mw stated in the present description are molar masses determined or to be determined by gel permeation chromatography (GPC; divinylbenzene-crosslinked polystyrene as the immobile phase, tetrahydrofuran as the liquid phase, polystyrene standards).

As used herein, "binder" refers to the film forming component of a coating. To form the films, the polymeric binder (i.e., polymer) may be crosslinked or coalesced. Crosslinking of binders includes the addition of at least one crosslinking agent that reacts with the binder. Coalescence refers to the process where first the solvent (e.g., water) evaporates causing the polymeric binders to be drawn together and then fused into irreversibly bound networked structures, so that the coating cannot redissolve in the original carrier solvent. Polymeric binder resin is also referred to as "binder" and "polymeric binder."

As used herein, "water-reducible polymeric binder" (i.e., water-reducible binder) refers to a hydrophobic resin that has been modified to contain acidic groups such that the binder is soluble in water with at least partial neutralization. As used herein, "water-dispersible polymeric binder" (i.e., water-dispersible binder) refers to resins with acidic groups that could be dispersed in a continuous aqueous medium with at least partial neutralization.

As used herein, "substantially free" refers to less than about 2 wt % of the specified component based on the total weight of the composition. In some embodiments, the composition may include less than about 1 wt %, less than about 0.5 wt %, or less than about 0.1 wt %. In some embodiments, the composition may free of detectable amounts of the component.

In one aspect, the present technology provides compositions that include a polymeric binder resin, an ether amine, and water, wherein the polymeric binder resin includes acid functional groups, at least a portion of which are neutralized by the ether amine such that the polymeric binder resin is dissolved or dispersed in the water, provided that the polymeric binder resin is not a polyurethane; and the ether amine is a compound of formula I:

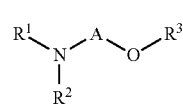

Formula I wherein $R^1$ and $R^2$ may independently be a $C_1$-$C_4$ alkyl or $C_3$-$C_4$ cycloalkyl group; or $R^1$ and $R^2$, together with the nitrogen to which they are attached, may form a $C_4$-$C_5$ member heterocycloalkyl ring; A may be a $C_2$-$C_6$ alkylene or $C_3$-$C_6$ cycloalkylene ring; and $R^3$ may be $C_1$-$C_4$ alkyl or $C_3$-$C_4$ cycloalkyl group; provided that the compound of formula I contains no more than 10 carbons. In some embodiments of the compound of Formula I, the alkyl, alkylene, cycloalkyl, and/or heterocycloalkyl group(s) is unsubstituted. The ether amine serves as an "amine neutralizer" for the polymeric binder resin and is a low molecular weight (<200 g/mol) organic compound that includes a tertiary amine and an ether functional group.

In some embodiments, $R^1$ and $R^2$ may independently be a $C_1$-$C_4$ alkyl group. In some embodiments, $R^1$ and $R^2$ may independently be a $C_1$-$C_2$ alkyl group. $R^1$ and $R^2$ may be the same. In some embodiments, $R^1$ and $R^2$ may each be methyl.

In some embodiments, $R^3$ may be a $C_1$-$C_4$ alkyl group. $R^3$ may be a $C_1$-$C_2$ alkyl group. For example, $R^3$ may be a methyl.

In some embodiments, A may be a $C_2$-$C_6$ alkylene group. In some embodiments, A may be a $C_2$-$C_4$ alkylene group. For example, A may be a $C_2$ alkylene group or A may be a $C_3$ alkylene group.

In some embodiments, the compound of formula I may contain less than 10 carbons. In some embodiments, the compound of formula I may contain 4, 5, 6, 7, 8, or 9 carbon atoms. For example, the compound of formula I may contain 4, 5, 6, or 7 carbon atoms. In some embodiments, the compound of formula I may contain 5 or 6 carbon atoms. In some embodiments, A is not $C_2$ when $R^1$, $R^2$, and $R^3$ are each methyl.

In some embodiments, the ether amine may be N,N-dimethylmethoxypropylamine (DMMOPA), N,N-dimethylmethoxyethylamine (DMMOEA), or a combination thereof.

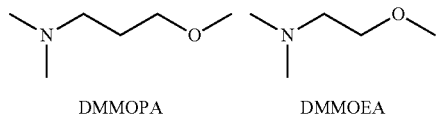

DMMOPA  DMMOEA

The ether amine neutralizers described herein may have a boiling point less than about 200° C. (at 760 mm Hg). In some embodiments, the ether amine may have a boiling point less than about 180° C. In some embodiments, the ether amine may have a boiling point from about 60° C. to about 200° C. In some embodiments, the ether amine may have a boiling point from about 70° C. to about 160° C. In some embodiments, the ether amine may have a boiling point from about 80° C. to about 140° C.

Compositions of the present technology may include a wide range of amounts of the ether amine neutralizers described herein. For example, the compositions may include from about 0.1 wt % to about 10 wt % of the ether amine based on the total weight of the composition. For example, the composition may include about 0.15 wt % to about 5 wt % of the ether amine including about 0.2 wt % to about 3 wt %, about 0.2 wt % to about 2 wt %, or about 0.5 wt % to about 2.5 wt %. In some embodiments, the compositions may include about 0.1 wt %, about 0.15 wt %, about 0.2 wt %, about 0.3 wt %, about 0.4 wt %, about 0.5 wt %, 0.75 wt %, about 1 wt %, about 1.5 wt %, about 2 wt %, about 3 wt %, about 4 wt %, about 5 wt %, about 6 wt %, about 7 wt %, about 8 wt %, about 9 wt %, or a range between and including any two of the foregoing values. In some embodiments, the ether amine neutralizes at least about 20% of the acid functional groups on the polymeric binder (e.g., at least about 30%, at least about 40%, or at least about 50%). In some embodiments, the ether amine neutralizes about 20% to about 100% of the acid functional groups on the polymeric binder (e.g., about 30% to about 90% or about 40% to about 80%. In some embodiments, the molar ratio of the ether amine to the acid functional groups on the polymeric binder may be about 1:5 to about 5:1 (e.g., about 1:4 to about 2:1, about 1:3 to about 2:1, or about 1:2 to about 1:1).

In some embodiments, the composition is an aqueous based coating (e.g., paint). In some embodiments, the composition may be an aqueous dispersion or emulsion. At times, the polymeric binder resin may be a water-reducible, a water-dispersible polymer, or an emulsion polymer. Binders include polymers such as a polyacrylate (e.g., acrylic polymers including acrylic polyols, vinyl-acrylic copolymers, acrylic-vinyl versatate copolymers, and styrene-acrylic copolymers), polyvinyl versatate, polyethylene-vinyl acetate, polyester (e.g., polyester polyols and polyester polymers with one or more olefins), or a combination of two or more thereof. The amount of the binder resins in the formulations of the present technology can be the amount conventionally used in paint and coating formulations, which can vary widely due to the desired gloss/sheen range, and also the solids concentration, of a specific paint formulation.

Compositions of the present technology include water. The water may be used as a solvent and/or as a thinner when preparing and/or applying the coating composition. In some embodiments, the compositions may include at least about 20 wt % water, at least about 25 wt % water, at least about 30 wt % water, at least about 35 wt % water, at least about 40 wt % water, at least about 45 wt % water, at least about 50 wt % water, at least about 55 wt % water, at least about 60 wt % water, or a range between and including any two of the foregoing values. In some embodiments, the compositions may include about 20 wt % to about 99 wt % water, about 35 wt % to about 97 wt %, about 45 wt % to about 95 wt %, about 50 wt % to about 93 wt %, or a range between and including any two of the foregoing values. In some embodiments, the compositions may include about 20 wt % to about 80 wt % water.

In some embodiments, the binders of the present technology form a film through physically coalescing. In some embodiments, the binders of the present technology form a film by chemical curing. The crosslinking agent may be added to the composition or may be oxygen from the environment (e.g., alkyd binder). In some embodiments, the binders of the present technology form a film by both physically coalescing and chemically curing.

The polymeric binders used herein include acid functional groups such as carboxyl, sulfonyl, phosphonyl, and/or phosphoric acid groups. In some embodiments, the acid functional groups are carboxyl groups. In some embodiments, the polymeric binders may have acid values of about 2 to about 200 mg KOH/g. In some embodiments, the polymeric binders may have acid values of about 5 to about 150 mg KOH/g or about 10 to about 100 mg KOH/g.

In some embodiments, the binder may include a polyacrylate, polyester, or a combination of two or more thereof. In some embodiments, the polymer binder is crosslinked with a crosslinking agent (e.g., amino crosslinking agent). In some embodiments, the binder may include a polyester. In some embodiments, the binder may be an alkyd binder. In some embodiments, the binder may include polyacrylate, polyvinyl versatate, polyethylene-vinyl acetate, or a combination thereof. The polyacrylate may be a homopolymer or a copolymer. Exemplary copolymers of polyacrylate include polyvinyl acrylate, polyvinyl versatate-acrylate, polystyrenyl acrylate, or a combination of two or more thereof. In some embodiments, the binder may be a latex binder. The binders provided herein may be used individually in the compositions or may be used in combination as a simple blend or as a hybrid type copolymer.

The binders may include functional groups with active hydrogens (e.g., hydroxyl, carboxyl, thiol and the like) that may be cross-linked with cross-linking agents to form cross-links such as, but not limited to, esters, ethers, thioesters, and/or thioethers, among others. Thus, the polymer binder may include one or more compounds with at least one amino reactive functional group. In some embodiments, the binder may have one or more functional groups including, but not limited to, hydroxyl groups. The polymeric binders may include other functionality including non-ionic functionality. In some embodiments, the compositions may include one or more emulsifiers. In some embodiments, the binder may be substantially free of functional groups with active hydrogens (e.g., hydroxyl, carboxyl, thiol and the like). In some embodiments, the binder may be unsaturated such that cross-linking of the unsaturated sites may occur. In some embodiments, such cross-linking may be catalyzed by a metallic drier and/or non-metallic drier promoter.

In some embodiments, the composition may include a crosslinking agent, catalyst, or a combination thereof. In some embodiments, the composition may include an amino cross-linking agent such as a melamine resin as described herein. Catalysts include weak organic or inorganic acid catalysts such as p-toluenesulfonic acid ("p-TSA"), CYCAT® 4040, maleic acid, citric acid, phosphoric acid, or alkyl phosphoric acids In some embodiments, the composition may further include one or more additional neutralizing agents (e.g. hydroxides, amines, ammonia, and carbonates). Neutralizing agents are often included in formulations to raise the pH to a desired value, e.g., to 7, 8, 9, 10, 11, 12, 13, or a range between and including any two of the foregoing values. In some embodiments, the compositions may have a pH range of about 7 to about 13 or about 7 to about 10.

The binders of the present technology may be prepared by way of a wide range of processes. For example, the binders may be prepared in organic phase or in melt and then converted into water, the binder resin could also be prepared by emulsion polymerizations, or any other method known to those of skill in the art.

In a further aspect, the technology provides paints and coatings used for example, in different coating applications such as residential and/or industrial coating applications, architectural coating applications, automotive coating applications, outdoor furniture coating applications, exteriors and interiors of houses, and other buildings.

The paint or coating compositions, in addition to comprising a binder, an ether amine compound of formula I, and water, may also include one or more pigments, one or more cosolvents, or a combination thereof. Other ingredients/additives may be included in the compositions including, but not limited to, coalescents, leveling agents and surfactants, thickeners (e.g., cross-linked polycarboxylic acid or polyurethanes), rheology modifiers (e.g., highly disperse silicic acid or polymeric urea compounds), corrosion inhibitors, defoamers, wetting agents, dispersants, additional neutralizer(s) (i.e., bases), biocides, flow control agents based on (meth)acrylic homopolymers or silicon oils, or combinations of two or more thereof. Such ingredients may provide specific properties to the composition and/or the film, such as mildew resistance, defoaming, light stability, and/or good flow and leveling during application. For example, the compositions may include one or more ingredients/additives selected from the group consisting of leveling agents, surfactants, thickeners, rheology modifiers, co-solvents, corrosion inhibitors, defoamers, co-dispersants, additional neutralizer(s), and biocides. The additives may be added in the usual amounts familiar to the person skilled in the art.

The carrier is the solvent in which composition materials are dissolved, dispersed, and/or suspended. In the compositions of the present technology, the carrier is water, although other water-based solutions such as water-alcohol mixtures and the like may be used. The aqueous carrier generally makes up the balance of the composition, after all the other ingredients have been accounted for. In some embodiments, the composition may include a cosolvent such as an organic solvent. For example, the cosolvent may be an alcohol (e.g., methanol, ethanol, or isopropyl alcohol), glycol ether such as ethylene glycol, diethylene glycol, and/or propylene glycol (e.g., propylene glycol $C_1$-$C_4$ alkyl ether, $C_1$-$C_4$ alkoxyethanol such as butoxyethanol), a heterocycle such as a lactone (e.g., N-methyl-2-pyrrolidone), glycerin, or a combination thereof. Cosolvents are sometimes present in the composition to aid in film formation, to resist freezing, and/or enhance brushing properties, such as by increasing open time. Open time is the time that a coating remains workable after it has been applied to a substrate. Open time allows for rebrushing or "melting in" of the newly applied coating at the lap, without causing brush marks, loss of gloss, or lap lines in the final dried coating. A lap is an area on a substrate where additional coating is applied onto a portion of a previously coated, but still wet, adjacent substrate area. In some embodiments, the compositions may include no more than about 15 wt % cosolvent (e.g., 1-15 wt %), based on total composition. Alternatively, the compositions may include no more than about 10 wt % cosolvent or no more than about 5 wt % cosolvent (e.g., 1-10 or 1-5 wt %).

Leveling agents are added to change the surface tension and improve wetting. Leveling agents are a subset of surfactants used to insure that a composition flows out over and completely wets the surface being coated. Reduced contact angles between the composition and the surface lead to better flow leveling, and better surface wetting allows for better adhesion of the composition and the physically coalesced and/or chemically cured film. Surfactants are also important as grinding aids for pigment grinding operations.

Thickeners are used to obtain the desired degree of viscosity needed for the proper formulation and application of the composition. One general type of thickener is referred to in the art by the term "associative." Associative thickeners are so called because the mechanism by which they thicken is believed to involve hydrophobic associations between the hydrophobic moieties in the thickener molecules and/or between the hydrophobic moieties in the thickener molecules and other hydrophobic surfaces. One type of commonly used associative thickener has a polymeric backbone constructed from one or more blocks of polymerized oxyalkylene units, typically polyethylene oxide or polypropylene oxide, with hydrophobic groups attached to or within the backbone. Another type of commonly used associative thickener utilizes a cellulosic backbone with hydrophobic groups attached to the backbone. Both of these types of associative thickeners can be characterized as polyether thickeners as they both have backbones comprising ether linkages. Known polyether associative thickeners are nonionic thickeners, and their thickening efficiencies in aqueous systems are substantially independent of pH. Other thickeners may also be included in the compositions such as those described in U.S. Pat. No. 7,741,402, which is herein incorporated by reference.

Rheology modifiers may be added to thicken the compositions and to increase its yield stress, thus allowing for the formation of a stable suspension of pigments in resin upon mixing. Rheology modifiers are also added to optimize the application properties of the composition. Pigment dispersants are added to create a stable dispersion of the pigment. Pigment dispersants function by directly interacting with pigment particles both mechanically and electrostatically. Rheology modifiers function by increasing the yield stress of the water-resin system.

Corrosion inhibitors and flash rust inhibitors suppress the migration of colored corrosion products from the surface of coated metal objects (e.g., exposed nail heads in drywall) to the surface of the coating. Also, rust inhibitors may be added to prevent corrosion of iron alloy cans during coating storage.

Biocides and mildewcides are added to control microbial growth in the compositions and/or in the film. Microbes can colonize leading to filamentous growths, bad odors and the selective consumption of functional coating ingredients. Some biocides are added solely to control microbes during storage of the composition (so called in-can biocides) while other biocides are added to impart biostability to the coalesced/cured film (so called dry film biocides). Some biocides can prevent both in-can and dry film biological growth. Typical biocides include isothiazolinones, such as 5-chloro-2-methyl-4-isothizolin-3-one; benzoisothiazolinones; triazines, such as hexahydro-1,3,5-tris-2-hydroxyethyl-s-triazine; 1-(3-chloroallyl)-3,5,7-triaza-1-azoniaadamantane chloride (DOWICIL® 75); zinc pyrithione; gluteraldehyde; bronopol; and phenolics.

Defoamers are special types of surfactants that have the effect of decreasing the foaminess of an agitated coating compositions, when it is manufactured, when it is shaken or stirred, and when it is applied to a surface. Defoamers are commercially available under a number of tradenames such as, for example, FOAMASTER®, ADVANTAGE® 1512, and BYK® 1650.

Although the present compositions may be used without pigments (as clear coats), pigments may be included to provide hiding power and the desired color to the final coated material and may also be used to provide bulk to the paint or coating. All color and/or special effect-giving pigments of organic or inorganic type used in paints and coatings are suitable for use. "Colorants," as used herein, include dyes, pigments, and pre-dispersions, among others. Colorants are pigments that provide color. Colorants include red, white, blue, black, and yellow. As used herein, "pigment" refers to finely ground, insoluble material suspended in a medium, which changes the color of reflected or transmitted light through wavelength-selective absorption. Pigments typically possess high tinting strength properties and are stable in solid form at ambient temperatures. Pigments can be natural or synthetic products. While multiple pigments may be present in end-use paints or coatings, it is also possible to use only white pigment, such as titanium oxide, perhaps in combination with extender pigments. Any other desired pigments of various colors (including more white pigment) can optionally be included in the compositions. Examples include colors such as yellow, magenta, and cyan. As a black coloring agent, carbon black, and a coloring agent toned to black using the yellow/magenta/cyan coloring agents. Colorants may be used singly, in a mixture, or as a solid solution. In various embodiments, pigments may be provided in the form of raw pigments, treated pigments, pre-milled pigments, pigment powders, pigment presscakes, pigment masterbatches, recycled pigment, and solid or liquid pigment pre-dispersions. As used herein, a raw pigment is a pigment particle that has had no wet treatments applied to its surface, such as to deposit various coatings on the surface. Raw pigment and treated pigment are further discussed in PCT Publication No. WO 2005/095277 and U.S. Patent Application Publication No. 20060078485, the relevant portions of which are incorporated herein by reference. In contrast, a treated pigment may have undergone wet treatment, such as to provide metal oxide coatings on the particle surfaces. Examples of metal oxide coatings include alumina, silica, and zirconia. Recycled pigment may also be used as the starting pigment particles, where recycled pigment is pigment after wet treatment of insufficient quality to be sold as coated pigment. Exemplary colorant particles include, but are not limited to, pigments such as yellow coloring agent, compounds typified by a condensed azo compound, an isoindolynone compound, an anthraquinone compound, an azometal complex methine compound, and an allylamide compound as pigments may be used. As a magenta coloring agent, a condensed azo compound, a diketopyrrolopyrrole compound, anthraquinone, a quinacridone compound, a base dye lake compound, a naphthol compound, a benzimidazolone compound, a thioindigo compound, and a perylene compound may be used. As a cyan coloring agent, a copper phthalocyanine compound and its derivative, an anthraquinone compound, a base dye lake compound, and the like may be used.

Additional examples of pigments can include, but are not limited to, titanium dioxide, kaolin clay, calcined kaolin clay, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, quinacridone magenta, quinacridone violet, and the like, and any combination thereof. In some embodiments, the pigment is selected from the group consisting of titanium dioxide, clay, silica, diatomaceous silica, calcium carbonate, talc, zinc oxide, mica, red oxide, hansa yellow, phthalo blue, and yellow ochre.

In some embodiments, the pigment may be a special effect pigment. Examples of special effect pigments are metal pigments, for example, from aluminum or copper, interference pigments, such as, for example, aluminum coated with titanium dioxide, coated mica, graphite effect pigments and iron oxide laminae. Some special effect pigment may be inhibitor and/or extender pigments. Inhibitors, such as rust inhibitors, are pigments that have little to no corrosive action. For example, metal pigments are commonly used to protect metallic surfaces from corrosion. Nonlimiting exemplary inhibitor pigments include zinc, chromate, phosphate, and borate based pigments. Extender pigments are typically added to paints and coatings to reduce the cost of formulations. They may also be used to modify the viscosity, sedimentation stability, and/or film strength. Commonly, extender pigments appear white and possess a refractive index similar to commonly used binders. Nonlimiting exemplary extender pigments include clay, silica, and mica.

In some embodiments, the amount of colorant (e.g., pigment) may be from about 10 wt % to about 75 wt % based on the total weight of the composition (e.g., about 10 wt %, about 20 wt %, about 30 wt %, about 40 wt %, about 70 wt % or a range between and including any two of the foregoing, such as from about 15 wt % to about 55 wt %).

In some embodiments, the present compositions may include fillers. Nonlimiting examples of fillers are silicon dioxide, barium sulfate, talcum, calcium carbonate, aluminum silicate and magnesium silicate.

The compositions as described herein may be applied by means of conventional application methods, for example, by rolling, brushing, dipping, or spraying onto any desired uncoated or pre-coated substrate. The surface of such structures to be coated with the compositions may comprise concrete, wood, metal, plastic, glass, drywall, or the like. Once applied, curing or drying/coalescing may then proceed at ambient temperature or elevated temperatures (e.g., about 25° C. to about 300° C. including about 50° C. to about 180° C.) depending on the composition.

The compositions described herein are film forming compositions. The films derived from the compositions may have any thickness; for example, such films may have a thickness in the range of from 0.1 μm to 10 mm; or in the alternative, from 1 μm to 1000 μm; or in the alternative, from 5 μm to 500 μm; or in the alternative, from 10 to 100 Gm; or in the alternative, from 10 μm to 80 μm; or in the alternative, from 10 to 50 μm.

In some embodiments, the composition may be cured or physically coalesced at temperatures ranging from about 0° C. to about 300° C. In some embodiments, the composition may be cured at temperatures of at least about 80° C. In some embodiments, the composition may be cured at temperatures ranging from about 80° C. to about 180° C. For example, the composition may be cured at about 85° C., 90° C., 95° C., 100° C., 105° C., 110° C., 120° C., 130° C., 140° C., 150° C., 160° C., 170° C. or a range between and including any two of the foregoing values. In some embodiments, the composition may be cured or physically coalesced at temperatures of at least about 5° C. In some embodiments, the temperatures may be at least about 10° C. In some embodiments, the temperatures may be at least about 15° C. For example, the composition may be cured or physically coalesced at about room temperature. In some embodiments, the composition may be chemically cured for at least about 10 seconds, at least about 1 minute, at least about 5 minutes, at least about 10 minutes, or at least about 20 minutes. For example, the composition may be cured for about 1 minute to about 150 minutes, about 10 minutes to about 45 minutes, about 30 minutes to about 60 minutes, or about 20 minutes to about 120 minutes. In some embodiments, the composition may be physically coalesced after about 60 minutes, after about 5 hours, after about 10 hours, after about 15 hours, or after about 1 day. For example, the composition may be physically coalesced after about 60 minutes to about 1 week, about 5 hours to about 12 days, about 10 hours to about 10 days, or about 1 day to about 7 days.

Amino Cured Binders

In one aspect, the present technology provides a composition that includes a polymeric binder resin, an ether amine of formula I as described herein, and water, wherein the polymeric binder resin comprises acid functional groups, at least a portion of which are neutralized by the ether amine such that the polymeric binder resin is dissolved or dispersed in the water, provided that the polymeric binder resin is not a polyurethane. In some embodiments, the polymeric binder resin includes any amino curable binder known to those of skill in the art. In some embodiments, the polymeric binder resin includes a polyester and/or polyacrylate. In some embodiments, the polyester may be substituted with at least two or more hydroxyl groups (i.e., polyester polyol). In some embodiments, the polyacrylate may be substituted with at least two or more hydroxyl groups (i.e., acrylic polyol). In some embodiments, the composition may further include an amino cross-linking agent. In some embodiments, the polymeric binder resin may include the reaction product of a polyester and/or polyacrylate and an amino cross-linking agent.

In some embodiments, the composition may include about 10 wt % to about 80 wt % of the polymeric binder, based on the total weight of the composition. For example, the composition may include about 15 wt % to about 60 wt % or about 20 wt % to about 50 wt % polymeric binder. In some embodiments, the composition may include have a solids content of about 10 wt % to about 85 wt %, based on the total weight of the composition. For example, the composition may have a solids content of about 25 wt % to about 80 wt % or about 35 wt % to about 75 wt %.

The amino crosslinking agent may crosslink the polyester or polyacrylate described herein. In some embodiments, the composition may include from about 5 wt % to about 50 wt % or about 10 wt % to about 30 wt % of the amino crosslinking agent based on the weight of the polymeric binder resin. In some embodiments, the amino cross-linking agent may be an amino resin. In some embodiments, the amino resin may include a melamine based resin, benzoquanamine based resins, urea based resins, glycoluril based resins, or a combination of two or more thereof. Examples of suitable amino cross-linking agents may include one or more of the following:

Melamine Based Resins:

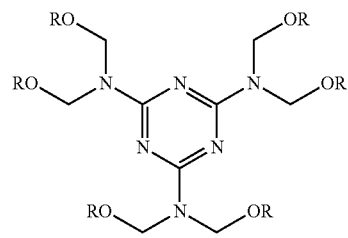

wherein R at each occurrence is individually selected from H and $C_1$-$C_6$ alkyl group. In some embodiment, R at each occurrence is individually selected from H and $C_1$-$C_4$ alkyl group. In some embodiments, R at each occurrence is a combination of H and a $C_1$-$C_4$ alkyl group. For example, R may be $CH_3$ (Cymel® 300, 301, 303), $CH_3$, $C_2H_5$(Cymel® 1116), $CH_3$, $C_4H_9$ (Cymel® 1130, 1133), $C_4H_9$ (Cymel®1156), or $CH_3$, H (Cymel® 370, 373, 380, 385) (available from Palmer Holland). In some embodiments, R is a combination of H and $CH_3$ (Cymel® 325). In some embodiments, R is $CH_3$ (Cymel® 303). In some embodiments, the melamine based resin may be selected from the group consisting of melamine-formaldehyde resin(s), alcoholated melamine-formaldehyde resin(s), and combinations thereof. In some embodiments, the melamine resin may be a methylated melamine resin.

Benzoquanamine Based Resins:

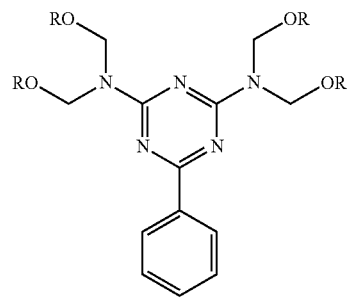

wherein R is $CH_3$, $C_4H_9$(Cymel® 1123).

Urea Based Resins:

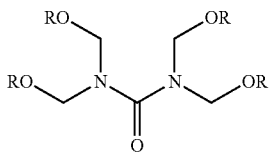

wherein R is CH$_3$, H (Beetle™ 60, Beetle™ 65) or C$_4$H$_9$ (Beetle™ 80).

Glycoluril Based Resins:

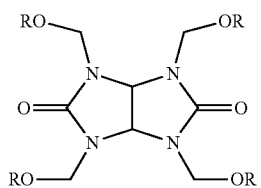

wherein R is CH$_3$, C$_2$H$_5$ (Cymel® 1171) or C$_4$H$_9$(Cymel® 1170).

In some embodiments, the polymeric binder resin may include one or more functional groups including, but not limited to, hydroxyl and/or carboxyl groups. In some embodiments, the polymeric binder resin may include curable functional groups selected from hydroxyl, thiol, and amino groups. In some embodiments, the binder may be a water-reducible binder. In some embodiments, the binder may be a dispersion. In some embodiments, the composition may be a dispersion or emulsion.

In some embodiments, the polymeric binder resin may have a number average molar mass ($M_n$) of about 600 g/mol to about 300,000 g/mol. For example, the polyacrylate polymeric binder resin may have a $M_n$ of about 950 g/mol to about 250,000 g/mol, about 900 g/mol to about 200,000 g/mol, about 800 g/mol to about 150,000 g/mol, about 1100 g/mol to about 150,000 g/mol, or about 1100 g/mol to about 50,000 g/mol. In some embodiments, the polyester polymeric binder may have a $M_n$ of about 500 g/mol to about 20,000 g/mol, about 600 g/mol to about 18,000 g/mol, about 800 g/mol to about 15,000 g/mol, about 1000 g/mol to about 12,000 g/mol, or about 1100 g/mol to about 10,000 g/mol.

In some embodiments, the polyacrylate may have an acid number of about 10 to about 100 mg KOH/g including about 12 to about 75 mg KOH/g, or about 15 to about 50 mg KOH/g. In some embodiments, the polyacrylate may have a hydroxyl number of about 40 to about 400 mg KOH/g including about 50 to about 300 mg KOH/g, or about 60 to about 250 mg KOH/g. In some embodiments, the polyacrylate may have an acid number of about 10 to about 100 mg KOH/g and/or a hydroxyl number of about 40 to about 400 mg KOH/g. For example, the polyacrylate may be Acrylmac™ WR232 (available from Polynt Composites USA) and/or Paraloid™ WR-97 (available from Dow Coating Materials).

In some embodiments, the polyester may have an acid number of about 10 to about 150 mg KOH/g including about 12 to about 75 mg KOH/g, or about 15 to about 50 mg KOH/g. In some embodiments, the polyester may have a hydroxyl number of about 40 to about 400 mg KOH/g including about 45 to about 300 mg KOH/g, or about 50 to about 200 mg KOH/g. In some embodiments, the polyester may have an acid number of about 10 to about 150 mg KOH/g and/or a hydroxyl number of about 40 to about 400 mg KOH/g. For example, the polyester may be Polymac WR 72-7203 (available from Polynt Composites USA.).

In some embodiments, the polyacrylate polymeric binder may be prepared by free-radical polymerization of polymerizable, olefinically unsaturated monomers, optionally, in presence of oligomeric or polymeric polyester and/or polyurethane resins. Such monomers, in addition to at least one olefinic double bond, also contain further functional groups. Further functional groups may be, for example, urea, hydroxyl, carboxyl, sulfonic acid, silane, amine, amide, acetoacetate, phosphoric, phosphonic, heterocyclic, and/or epoxy groups.

Olefinically unsaturated monomers with hydroxyl groups may be used to introduce hydroxyl groups into the polyacrylate polymeric binders. Suitable hydroxy-functional unsaturated monomers are, for example, hydroxyalkyl esters of alpha, beta-olefinically unsaturated monocarboxylic acids with primary or secondary hydroxyl groups. Nonlimiting examples include the hydroxyalkyl esters of acrylic acid, methacrylic acid, crotonic acid, maleic acid, fumaric acid, itaconic acid and/or isocrotonic acid. In some embodiments, the hydroxyl-functional unsaturated monomer may include the hydroxyalkyl esters of (meth)acrylic acid. Further olefinically unsaturated monomers with hydroxyl groups may also be used. In some embodiments, the polyacrylate may include polymerized monomers of acrylic acid or esters thereof and/or methacrylic acid or esters thereof. In some embodiments, the polyacrylate may include polymerized monomers of (meth)acrylate.

Carboxyl functional olefinically unsaturated monomers may be used to introduce carboxyl groups into the polyacrylate polymeric binders. Nonlimiting examples of suitable olefinically unsaturated carboxylic acids include acrylic acid, methacrylic acid, crotonic acid and isocrotonic acid, itaconic acid, maleic acid, fumaric acid and the halfesters of the difunctional acids. In some embodiments, the olefinically unsaturated carboxylic acid may include acrylic acid and/or methacrylic acid.

Other unsaturated monomers that may be used include aliphatic esters of olefinically unsaturated carboxylic acids such as (meth)acrylic acid, vinyl esters, and/or vinylaromatic hydrocarbons such as styrene. Other additional unsaturated monomers, which include other functional groups may also be used.

In some embodiments, the polyester may include the reaction product of a polyol and polycarboxylic acid. The polyesters may be saturated or unsaturated and they may optionally be modified with fatty acids, or polymerized in presence of oligomeric or acrylic polymer and/or polyurethane resins. In some embodiments, the polyesters may be produced using known processes with elimination of water from polycarboxylic acids and polyols (i.e., polyhydric alcohols). Polyols include alkylene diols and glycols; mono carboxylic acids and a polycarboxylic acids or anhydrides thereof, such as, dicarboxylic and/or tricarboxylic acids or tricarboxylic acid anhydrides. In some embodiments, polyesters may have thiol functionality in addition or instead of the hydroxyl functionality.

Examples of useful polyhydric alcohols include triols and tetraols, such as, trimethylolpropane, triethylolpropane, trimethylolethane, glycerine, pentaerythritol, tris(hydroxyethyl)isocyanurate and dihydric alcohols and diols that include ethylene glycol, propylene glycol, 1,4 butylene diol, 1,3 butylene diol, neopentyl glycol, diethylene glycol, dipropylene glycol, 1,6 hexane diol, 1,4-cyclohexane dimethanol, Esterdiol 204 (Trademark of Union Carbide) and 1,3-propane diol.

In some embodiments, the polyol may have a low molecular weight (<500 g/mol). Nonlimiting polyols include ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, neopentyl glycol, glycerol, 1,3-propanediol, 2,4-dimethyl-2-ethylhexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, mannitol, glycerine, trimellitic anhydride, pyromellitic dianhydride, dimethylolpropionic acid, and combinations of two or more thereof. In some embodiments, the polyol may include trimethylolethane, pentaerythritol, erythritol, threitol, dipentaerythritol, sorbitol, glycerine, trimellitic anhydride, pyromellitic dianhydride, dimethylolpropionic acid, and/or trimethylolpropane. For example, the polyol may be trimethylolpropane, glycerine, or pentaerythritol. In some embodiments, the polyol may include ethylene glycol, diethylene glycol, neopentyl glycol, 1,4-butanediol, 1,6-hexanediol, glycerol, pentaerythritol, sorbitol, or mannitol. In some embodiments, the polyol may include dihydroxyalkanoic acids and/or 2,2-dimethylol propionic acid (DMPA). In some embodiments, the polyol may include dihydroxyalkanoic acids and/or 2,2-dimethylol propionic acid (DMPA).

Polyhydric alcohols having carboxyl groups may be used. In some embodiments, the polycarboxylic acid may be a saturated polycarboxylic acid (e.g., saturated fatty acid). In some embodiments, the polycarboxylic acid may include a saturated polycarboxylic acid such as a saturated fatty acid. As used herein, polycarboxylic acids include anhydrides or esters thereof. In some embodiments, the polycarboxylic acid may be a dicarboxylic acid. In some embodiments, the polycarboxylic acid may include one or more of the following: castor, palm, coconut oils, synthetic saturated fatty acid (e.g., Cardura), and anhydrides and combinations thereof.

In some embodiments, the polycarboxylic acids and anhydrides that can be used to form the polyester are aromatic carboxylic acids, such as isophthalic acid, terephthalic acid, phthalic acid, phthalic anhydride, dimethyl terephthalic acid, naphthalene dicarboxylic acid, tetrachlorophthalic acid, terephthalic acid bisglycol ester, benzophenone dicarboxylic acid, trimellitic acid and trimellitic anhydride. Typical aliphatic carboxylic acids that can be used to form the polyester include adipic acid, azelaic acid and succinic acid.

In some embodiments, the binder resin may be a nondrying alkyd resin. In some embodiments, the binder resin may be a short oil alkyd where the percentage of drying oil is very low in relation to the base polyester polymer or backbone chain. These coatings will not air dry or harden unless heated. Short oil alkyds are employed as baking enamels for finished metal products, in conjunction with amino/formaldehyde resins.

In some embodiments, the composition may include a curing catalyst. In some embodiments, the catalyst may be an acid. Catalysts include weak organic or inorganic acids such as a sulfonic acid (e.g., p-toluenesulfonic acid ("p-TSA") or alkyl benzene sulfonic acid such as CYCAT® 4040 (available from Palmer Holland)), maleic acid, citric acid, phosphoric acid, alkyl phosphoric acid, a blocked acid, or a combination of two or more thereof. Other catalysts include blocked acid catalysts including blocked paratoluene sulfonic acid, blocked dodecyl benzene sulfonic acid, blocked dinonyl naphthalene disulfonic acid in which the blocking agent is an amine, such as, AMP, dimethyl oxazolidine or N-methyldiethanolamine or other organic amines. In some embodiments, the catalyst may be p-TSA. In some embodiments, the composition may include from about 0.1 wt % to about 2 wt % of the catalyst based on the total weight of the composition. For example, the composition may include about 0.2 wt % to about 1 wt % of the catalyst or about 0.4 wt % to about 0.6 wt %.

An alkyl or aryl acid phosphate catalyst, such as, butyl acid phosphate or phenyl acid phosphate can be used in addition to the above acid catalysts. Other catalysts that can be used to improve the cure rate of the composition include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelates, and other such catalysts or mixtures there of known to those skilled in the art.

In some embodiments, the composition may further include one or more additional ingredients described herein.

In some embodiments, the composition may include the amount of water as described herein. In some embodiments, the composition may include at least about 20 wt % water, based on the total weight of the composition. For example, the composition may include about 30 wt % to about 70 wt % water, about 35 wt % to about 60 wt %, or about 40 wt % to about 50 wt % water. In some embodiments, the binder may be dissolved in water. In other embodiments, the binder may be dispersed in water.

In some embodiments, the composition may include a cosolvent such as an organic solvent as described herein. Cosolvents may originate from the preparation of the binders or may be added separately. Examples of suitable solvents are monohydric or polyhydric alcohols (e.g., methanol, ethanol, propanol including isopropanol, butanol, hexanol); glycol ethers or esters (e.g., diethylene glycol dialkyl ether, dipropylene glycol dialkyl ether, each with $C_1$-$C_6$ alkyl, ethoxypropanol, butyl glycol); glycols (e.g., ethylene glycol, propylene glycol), and ketones (e.g., methyl ethyl ketone, acetone, cyclohexanone); N-methylpyrrolidone, N-ethylpyrrolidone, aromatic or aliphatic hydrocarbons (e.g., toluene, xylene, or straight-chain or branched aliphatic $C_6$-$C_{12}$ hydrocarbons), or combinations thereof. Water-miscible organic solvents are preferred. In some embodiments, the cosolvent may be propyleneglycol-monopropylether. In some embodiments, the compositions may include no more than about 15 wt % cosolvent, based on total composition. For example, the compositions may include no more than about 10 wt % cosolvent.

In some embodiments, the composition may be substantially free of low molecular weight surfactants. In some embodiments, the composition does not contain low molecular weight surfactants. In some embodiments, the composition may be substantially free of dimethylethanolamine (DMEA). In some embodiments, the composition does not contain DMEA.

In some embodiments, the composition may be chemically cured at temperatures of at least about 80° C. In some embodiments, the composition may be chemically cured at temperatures ranging from about 80° C. to about 300° C.

including about 100° C. to about 220° C. For example, the composition may be cured at about 85° C., 90° C., 95° C., 100° C., 105° C., 110° C., 120° C., 130° C., 140° C., 150° C., 160° C., 170° C., 180° C. or a range between and including any two of the foregoing values. In some embodiments, the composition may be chemically cured by baking for at least about 10 seconds. For example, the composition may be baked for about 1 minute to about 60 minutes or about 15 minutes to about 45 minutes. The present technology also provides a method that includes chemically curing the composition provided herein at these temperatures.

In another aspect, the present technology provides a coating that includes the chemically cured composition.

The composition may be manufactured by conventional manufacturing techniques, which are well known to those skilled in the art. Typically, the compositions are manufactured by first mixing the polymeric binder resin with the ether amine neutralizer followed by the addition and grinding of pigment. Water may be added as needed to manage the viscosity. Next, the amino crosslinking agent as well as other additional optional ingredients may be added (e.g., a catalyst). Last, additional water may be added to adjust the solids and viscosity of the composition. However, for clear coat, pigments are not added in the process.

Metallic Drier Catalyst Cured Binders

In one aspect, the present technology provides a composition that includes a polymeric binder resin, an ether amine of formula I as described herein, and water, wherein the polymeric binder resin comprises acid functional groups, at least a portion of which are neutralized by the ether amine such that the polymeric binder resin is dissolved or dispersed in the water, provided that the polymeric binder resin is not a polyurethane. In some embodiments, the polymeric binder resin includes a polyester with one or more alkenyl groups. In some embodiments, the composition may further include a metallic drier. In some embodiments, the composition may include a non-metallic drier promoter. In some embodiments, the composition may further include a metallic drier and a non-metallic drier promoter. In some embodiments, the polymeric binder resin may include the reaction product of a polyol, an unsaturated and saturated polycarboxylic acid, and a metallic drier.

In some embodiments, the polymeric binder resin may include one or more functional groups including, but not limited to, hydroxyl and/or carboxyl groups. In other embodiments, the polymeric binder resin may be substantially free of curable functional groups selected from hydroxyl, thiol, and amino groups.

In some embodiments, the composition may include about 10 wt % to about 75 wt % of the polymeric binder, based on the total weight of the composition. For example, the composition may include about 15 wt % to about 65 wt % or about 20 wt % to about 60 wt % polymeric binder. In some embodiments, the composition may include have a solids content of about 10 wt % to about 85 wt %, based on the total weight of the composition. For example, the composition may have a solids content of about 25 wt % to about 80 wt % or about 35 wt % to about 75 wt %.

In some embodiments, the binder may be an alkyd binder. Alkyd resins are polyesters of polyhydroxyl alcohols (i.e., polyol) and polycarboxylic acids chemically combined with various long chain unsaturated fatty oils in different proportions. There are two types of alkyd resins: (1) drying (including semi-drying) and (2) non-drying alkyd resins. Drying resins, triglycerides derived from polyunsaturated fatty acids, are often derived from plant and vegetable oils, e.g. linseed oil. These drying alkyds are chemically cured in air. The drying speed and the nature of the coatings depends on the amount and type of drying oil employed (more polyunsaturated oil means faster reaction in air) and use of metallic drier(s) (i.e., oil drying agent(s)). In some embodiments, the metallic drier may be a metal salt. These metal complexes catalyze crosslinking of the unsaturated sites. In some embodiments, the binder may be a drying (including semidrying) alkyd resin.

In some embodiments, the polycarboxylic acid may include an unsaturated and a saturated polycarboxylic acid such as an unsaturated fatty acid and saturated fatty acid. As used herein, polycarboxylic acids include anhydrides or esters thereof, where they exist. In some embodiments, the polycarboxylic acid may be a dicarboxylic acid. In some embodiments, the polycarboxylic acid may include one or more of the following: phthalic acid, maleic acid, fumaric acid, isophthalic acid, succinic acid, adipic acid, azeleic acid, and sebacic acid, terephthalic acid, tetrachlorophthalic anhydride, tetrahydrophthalic anhydride, dodecanedioic acid, sebacic acid, azelaic acid, 1,4-cyclohexanedicarboxylic acid, 1,3-cyclohexanedicarboxylic acid, 2,6-naphthalenedicarboxylic acid, glutaric acid, trimellitic anhydride acid, citric acid, pyromellitic dianhydride acid, trimesic acid, sodium sulfoisophthalic acid. Optionally moncarboxylic acids may be employed including, but not limited to, benzoic acid.

Polyhydroxyl alcohols may include, but are not limited to, such components as ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, neopentyl glycol, glycerol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, mannitol. In some embodiments, the polyhydroxyl alcohols may include additional functional groups such as carboxyl groups.

In some embodiments, the binder resin may further include a drying oil, semi drying oil, or a combination thereof. Typical sources of long chain unsaturated fatty oils (i.e., drying oils) for alkyd binders may include, but are not limited to, coconut oil, linseed oil, tung oil, sunflower oil, cottonseed oil, safflower oil, walnut oil, soybean oil, fish oil, corn oil, caser oil, D.C.O. (made by dehydrating Castor oil, which creates a semi drying, conjugated, oil/fatty acid) and tall oil (resinous oil by-product from pulp and paper manufacturing). Non-drying resins are made from castor, palm, coconut oils and Cardura (a synthetic fatty, Versatic acid ex Shell). Suitable alkyds are further disclosed in Alkyd Resins, p. 1-18, Jones, N. Frank, Coatings Research Institute, Eastern Michigan University, Ypsilanti, Mich. 48197, USA, 2005, Wiley-VCH Verlag GmbH & Co.KgaA, Weinheim 10.1002/14356007.a01_409, which is herein incorporated by reference.

In addition to an amount of polyhydroxyl alcohols reacted with a fatty acid, fatty ester, or naturally occurring-partially saponified oil, an additional amount of a polyol or other branching agent such as a polycarboxylic acid may be used to increase the molecular weight and branching of the alkyd resin, and may be selected from trimethylolethane, pentaerythritol, erythritol, threitol, dipentaerythritol, sorbitol, glycerine, trimellitic anhydride, pyromellitic dianhydride, dimethylolpropionic acid, and trimethylolpropane.

Examples of suitable metallic driers include metal-containing compound, for example, cobalt, zirconium, manganese, calcium, zinc, copper, barium, vanadium, cerium, iron, potassium, strontium, aluminum, bismuth, lithium-containing compounds, or a combination of two or more thereof. In some embodiments, the metallic drier may include cobalt and/or manganese. Examples of suitable non-metallic drier promoters include 8-hydroxyquinoline, quinoline, salicyl aldoxime, pyridine-2-carbaldoxime, acetylacetonate enamines, 2-2'-bipyridyl, ethylenediamine, propylenediamine, pyridine, o-vinylpyridine, o-aminopyridine, aniline, o-phenylenediamine, o-toluidine, alpha-naphthylamine, o-phenanthroline, dipropylamine, diamylamine, acrylonitrile, succinonitrile, o-tolunitrile, o-toluamide, pyrrole, benzimidazole, benzotriazole, benzophenone, benzophenone, methacrylate, or a combination of two or more thereof. In some embodiments, the composition may include from about 0.0002 wt % to about 1.0 wt % of the metallic drier and/or nonmetallic drier promoter, based on the alkyd polymeric binder resin. For example, the composition may include about 0.0003 wt % to about 0.75 wt % or about 0.0005 wt % to about 0.5 wt % of the metallic drier and/or nonmetallic drier promoter. In some embodiments, the composition may include Oxi-Coat (OMG Fe based drier) as well as combination of Co Hydro-Cure II, Dri-RX HF, and Zr Hydro-CEM to yield a coating improved performance profile.

In some embodiments, the polymeric binder resin may have a number average molar mass ($M_n$) of about 800 g/mol to about 50,000 g/mol. For example, the polymeric binder resin may have a $M_n$ of about 900 g/mol to about 30,000 g/mol or about 1000 g/mol to about 20,000 g/mol.

In some embodiments, the polymeric binder resin has an acid number of about 10 to about 200 mg KOH/g. For example, the polymeric binder resin may have an acid number of about 15 mg to about 150 mg KOH/g or about 20 to about 100 mg KOH/g.

In some embodiments, the composition may further include one or more additional ingredients/additives described herein including, but not limited to, one or more pigments, leveling agents, surfactants, thickeners, rheology modifiers, co-solvents, corrosion inhibitors, defoamers, co-dispersants, additional neutralizer(s), and biocides.

In some embodiments, the composition may include the amount of water as described herein. In some embodiments, the composition may include at least about 20 wt % water, based on the total weight of the composition. For example, the composition may include about 30 wt % to about 70 wt % water, about 35 wt % to about 60 wt %, or about 40 wt % to about 50 wt % water. In some embodiments, the binder may be dissolved in water. In other embodiments, the binder may be dispersed in water.

In some embodiments, the composition may include a cosolvent such as an organic solvent as described herein. Cosolvents may originate from the preparation of the binders or may be added separately. Examples of suitable solvents are monohydric or polyhydric alcohols (e.g., methanol, ethanol, propanol including isopropanol, butanol, hexanol); glycol ethers or esters (e.g., diethylene glycol dialkyl ether, dipropylene glycol dialkyl ether, each with $C_1$-$C_6$ alkyl, ethoxypropanol, butyl glycol); glycols (e.g., ethylene glycol, propylene glycol), and ketones (e.g., methyl ethyl ketone, acetone, cyclohexanone); N-methylpyrrolidone, N-ethylpyrrolidone, aromatic or aliphatic hydrocarbons (e.g., toluene, xylene, or straight-chain or branched aliphatic $C_6$-$C_{12}$ hydrocarbons), or combinations thereof. Water-miscible organic solvents are preferred. In some embodiments, the cosolvent may be propyleneglycol-monopropylether. In some embodiments, the compositions may include no more than about 15 wt % cosolvent, based on total composition. For example, the compositions may include no more than about 10 wt % cosolvent.

In some embodiments, the composition may be a dispersion or emulsion. In some embodiments, the binder may be dispersed in water. Water content of the composition may preferably be controlled so that the solids content is between about 10 wt % to about 90 wt %, based on the total weight of the dispersion. In particular embodiments, the solids range may be between about 10 wt % to about 70 wt %. In other particular embodiments, the solids range is between about 40 wt % to about 70 wt %. In certain other embodiments, the solids range is between about 25 wt % to about 55 wt %. The solid content of the dispersion may have an average particle size diameter in the range of from 0.05 to 5 rm. All individual values and subranges from 0.05 to 5 μm are included herein and disclosed herein; for example, the average particle size diameter can be from a lower limit of 0.05, 0.1, 0.2, 0.5, or 1 μm to an upper limit of 1, 2, 3, 4, or 5 μm.

According to one embodiments, the alkyd binders described herein (including drying, semidrying, and non-drying) may be produced by two processes; the fatty acid process and the alcoholysis or mono-glyceride process. Higher quality alkyds are produced in the fatty acid process where the composition of the resulting resin can be more precisely controlled. In this process an acid anhydride, a polyol and an unsaturated fatty acid are combined and cooked together until the product has achieved a predetermined level of viscosity. For example penta alkyds are made this way. More economical alkyd resins are produced from the alcoholysis or glyceride process where end product quality control is not as paramount. In this process raw vegetable oil, high in unsaturated component, is combined with additional polyol and heated to cause transesterification of the triglycerides into a mixture of mono- and diglyceride oils. To this resulting mixture, acid anhydride is added to build up the molecular weight of the resin into roughly the same product as in the fatty acid process. However, the alcoholysis process produces a more randomly oriented structure. To remove the water produced as a by-product and to increase the reaction rate, surplus acid anhydride may be added. Water is thus removed with the unreacted acid by heating the bulk to a temperature needed to do this. Also, xylene can be added to produce an azeotrope with the water resulting in greater control at a lower temperature resulting in resins at a lower viscosity which are useful in making high solids paints (known as the AZO process). In both cases the resulting product is a polyester resin to which pendant drying oil groups are attached. In some embodiments, the reaction mixture for producing alkyds includes one or more aliphatic or aromatic polycarboxylic acids, esterified polymerization products thereof, and combinations thereof. Solvents may be added to reduce the viscosity. Various proportions of the polycarboxylic acid, polyol, and oil are used to obtain alkyd resins of various properties, as is well known in the art.

Alkyd binders may be classified in three classes; long, medium, and short. These terms represent the relative fraction of the drying oil component in the resin. Long oil alkyds have a high percentage of drying oil content and are generally sold as medium duty coatings for the consumer market. Medium oil alkyds have less drying oil and have a higher percentage of large molecular weight polyester backbone. They dry slower and are employed as high gloss coatings and wood finishes. At the bottom end are short oil alkyds where the percentage of drying oil is very low in relation to the base polyester polymer or backbone chain. These coatings will not air dry or harden unless heated. Short oil alkyds are employed as baking enamels for finished metal products, in conjunction with amino/formaldehyde resins.

The alkyds binders described herein may further include any one or more modifications, for example, alkyds may be urethane modified, phenolic modified, acrylic modified, styrene modified, vinyl ester modified, vinyl ether modified, silicone modified, epoxy modified, combinations thereof, and the like. By adding certain modifying resins, it is possible to produce thixotropic alkyds for decorative use. The latest alkyds are short oil A/D resins where the oil length is shortened by chain stopping with benzoic acid and now para tertiary butyl benzoic acid (Alkydal M 48). Alkyds for decorative use have extra oil cooked in to lengthen them and to make them more durable. Short oil resins used in stoving enamels are made from non-drying saturated oils or fatty acids (e.g., amino cured alkyd resins). These usually have much higher hydroxyl and acid values, to be able to react with the hydroxyl groups of the amino resins. These mixtures are usually stabilized with amines to prevent gelling on storage.

In some embodiments, the alkyds described herein may be modified by one or more uralkyds, i.e. urethane modified alkyd. Uralkyds may be prepared by reacting alkyds having isocyanate-reactive groups with polyisocyanates and optionally other components having isocyanate-reactive groups. Isocyanate-reactive groups are defined as groups which will react with an isocyanate group (—NCO) and examples include —OH, —NH$_2$, —NH—, and —SH. Preferred isocyanate-reactive groups are —OH. Other components include but are not limited to polyamines and polyols, for example polyols having water-dispersing groups, as described below.

Examples of suitable polyisocyanate(s), (normally diisocyanate(s)) include aliphatic and cycloaliphatic polyisocyanates such as ethylene diisocyanate, 1,6-hexamethylene diisocyanate HDI, isophorone diisocyanate (IPDI), cyclohexane-1,4-diisocyanate, 4,4'-dicyclohexylmethane diisocyanate, cyclopentylene diisocyanate, p-tetra-methylxylene diisocyanate (p-TMXDI) and its meta isomer (m-TMXDI), hydrogenated 2,4-toluene diisocyanate and hydrogenated 2,6-toluene diisocyanate. Also araliphatic and aromatic polyisocyanates may be used, such as p-xylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate and 1,5-naphthylene diisocyanate. Particularly preferred is 2,4-toluene diisocyanate (TDI), optionally in admixture with its 2,6-isomer. Mixtures of polyisocyanates can be used and also polyisocyanates which have been modified by the introduction of urethane, allophanate, urea, biuret, carbodiimide, uretonimine or isocyanurate residues.

Examples of suitable polyols for use in preparation of uralkyds include difunctional alcohols, trifunctional alcohols (e.g., glycerine, trimethylol propane, trimethylol ethane, trimethylol butane, tris hydroxyethyl isocyanurate, etc.), tetrahydric or higher alcohols (e.g., pentaerythritol, diglycerol, etc.), and combinations thereof. Trifunctional alcohols are preferred due to the degree of branching they allow. Difunctional alcohols (or diols), if used, are preferably used in combination with trifunctional or higher alcohols. Examples of suitable diols include neopentyl glycol (NPG), ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexane-dimethanol, 1,4-cyclohexanedimethanol, 2,2,4-trimethyl-1,3-pentanediol, 2,2,4-tetramethyl-1,3-cyclobutanediol, p-xylenediol, hydroxypivalylhydroxypivalate, 1,10-decanediol, and hydrogenated bisphenol A.

Alkyds binders described herein may include water-dispersing groups, for example, ionic groups such as anionic carboxylic acid groups, and/or non-ionic water-dispersing groups such as polyethylene oxide (PEO) chain groups. The composition may further include from less than about 10 wt % of one or more stabilizing agents, based on the total weight of the composition. All individual values and subranges from less than 10 weight percent are included herein and disclosed herein; for example, the weight percent can be from a lower limit of 1, 2, 3, 4, 5, 6 or 7 weight percent to an upper limit of 2, 3, 4, 6, 8, 9, or 10. The stabilizing agent may, for example, be an external stabilizing agent or an internal stabilizing agent. In selected embodiments, the stabilizing agent may be a surfactant, a polymer, or mixtures thereof. In certain embodiments, the stabilizing agent can be a polar polymer, having a polar group as either a comonomer or grafted monomer. In exemplary embodiments, the stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary polymeric stabilizing agents include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

The stabilizing agent may be partially or fully neutralized with the ether amine neutralizing agent describe herein alone or in combination with an additional neutralizing agent (e.g., a hydroxide such as ammonium, potassium, lithium, and/or sodium hydroxide. Other suitable neutralizing agents include carbonates and/or amines (e.g., monoethanolamine, 2-amino-2-methyl-1-propanol (AMP), diethanolamine, triethanolamine, and TRIS AMINO (each available from Angus), NEUTROL TE (available from BASF), and triisopropanolamine). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl)ethylenediamine, 1.2-diaminopropane. In some embodiments, mixtures of amines or mixtures of amines and surfactants may be used. Those having ordinary skill in the art will appreciate that the selection of an appropriate neutralizing agent depends on the specific composition formulated, and that such a choice is within the knowledge of those of ordinary skill in the art. In some embodiments, the molar ratio of neutralization agent(s) to stabilizing agent may be about 1:4 to about 2:1 (e.g., about 1:2 to about 1.1:1).

Additional stabilizing agents that may be useful in the practice of the present technology include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Stabilizing agents useful in the practice of the present technology can be either external surfactants or internal surfactants. External surfactants are surfactants that do not become chemically reacted into the alkyd resin during dispersion preparation. Examples of external surfactants useful herein include, but are not limited to, salts of dodecyl benzene sulfonic acid and lauryl sulfonic acid salt. Internal surfactants are surfactants that do become chemically reacted into the alkyd resin during dispersion preparation. An example of an internal surfactant useful herein includes 2,2-dimethylol propionic acid and its salts. Additional surfactants that may be useful in the composition include cationic surfactants, anionic surfactants, non-ionic surfactants, or combinations thereof. Various commercially available surfactants may be used in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS, DISPONIL FES-32-IS, DISPONIL FES-993, and DISPONIL TA-430, each available from Cognis; RHODAPEX CO-436, SOPROPHOR4D384, 3D-33, and 796/P, RHODACAL BX-78 and LDS-22, RHODAFAC RE-610, and RM-710, and SUPRAGIL MNS/90, each available from Rhodia; E-sperse 100, E-sperse 700, and E-sperse 701 from Ethox Chemical; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Mich.

In some embodiments, the composition may further include one or more additional binder compositions such as acrylic latex, vinyl acrylic latex, styrene acrylic latex, vinyl acetate ethylene latex, and combinations thereof. In some embodiments, the composition may further include one or more of the following: one or more co-solvents; one or more fillers; one or more additives; one or more pigments (e.g. titanium dioxide, mica, calcium carbonate, silica, zinc oxide, milled glass, aluminum trihydrate, talc, antimony trioxide, fly ash, and clay); one or more dispersants (e.g. aminoalcohols and polycarboxylates); one or more surfactants; one or more defoamers; one or more preservatives (e.g. biocides, mildewcides, fungicides, algaecides, and combinations thereof); one or more thickeners (e.g. cellulosic based thickeners such as hydroxyethyl cellulose, hydrophobically modified alkali soluble emulsions and hydrophobically modified ethoxylated urethane thickeners (HEUR)); one or more biocides; one or more flow agents; one or more leveling agents; and one or more additional neutralizing agents (e.g. hydroxides, amines, ammonia, and carbonates).

In one embodiments, one or more alkyds and one or more stabilizing agents are melt-kneaded in an extruder along with water and an ether amine of formula I as described herein to form an alkyd dispersion. In some embodiments, the dispersion is first diluted to contain about 1 wt % to about 20 wt % water and then, subsequently, further diluted to comprise greater than about 25 wt % water. Any melt-kneading means known in the art may be used. In some embodiments, a kneader, a BANBURY® mixer, single-screw extruder, or a multi-screw extruder, e.g. a twin screw extruder, is used. A process for producing the dispersions in accordance with the present composition is not particularly limited. For example, an extruder, in certain embodiments, for example, a twin screw extruder, is coupled to a back pressure regulator, melt pump, or gear pump. Exemplary embodiments also provide a base reservoir and an initial water reservoir, each of which includes a pump. Desired amounts of ether amine neutralizer and initial water are provided from the base reservoir and the initial water reservoir, respectively. Any suitable pump may be used, but in some embodiments, for example, a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the ether amine neutralizer and initial water are preheated in a preheater.

One or more alkyds, in the form of liquid, pellets, powder, or flakes, are fed from the feeder to an inlet of the extruder where the resin is melted or compounded. Optionally one or more fillers may be fed simultaneously with one or more alkyds into the extruder via the feeder; or in the alternative, one or more fillers may be compounded into one or more alkyds, and then fed into the extruder via the feeder. In the alternative, additional one or more fillers may further be metered via an inlet prior to the emulsification zone into the molten compound comprising one or more alkyds and optionally one or more fillers. In some embodiments, the stabilizing agent is added to one or more alkyds through and along with the one or more alkyds and in other embodiments, the stabilizing agent is provided separately to the twin screw extruder. The resin melt is then delivered from the mix and convey zone to an emulsification zone of the extruder where the initial amount of water and ether amine from the water and neutralizer reservoirs are added through an inlet. In some embodiments, stabilizing agent may be added additionally or exclusively to the water stream. In some embodiments, further dilution water may be added via water inlet from water reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, water is not added into the twin screw extruder but rather to a stream containing the resin melt after the melt has exited from the extruder. In this manner, steam pressure build-up in the extruder is eliminated and the dispersion is formed in a secondary mixing device such as a rotor stator mixer.

In an alternative, one or more alkyds, in the form of liquid or molten are fed into a first mixing device, such as a rotor stator mixer, and brought into contact with water, and optionally an ether amine as described herein, in the presence of one or more stabilizing agents, thereby forming a high internal phase emulsion. Subsequently, the high internal phase emulsion is contacted with additional water, thereby producing the alkyd dispersion of the present composition. The one or more alkyds may be melted via, for example, a melt pump. Such melt pumps are generally known to a person of ordinary skill in the art.

In some embodiments, the composition may be chemically cured at temperatures of at least about 0° C. In some embodiments, the temperatures may be at least about 5° C. In some embodiments, the temperatures may be at least about 10° C. In some embodiments, the temperatures may be at least about 15° C. For example, the composition may be chemically cured at about room temperature. In some embodiments, the composition may be chemically cured at temperatures ranging from about 0° C. to about 200° C. including about 5° C. to about 100° C. or about 10° C. to about 40° C. The present technology also provides a method that includes curing the composition at these temperatures.

In another aspect, the present technology provides a coating that includes the chemically cured composition.

Physically Coalescing Binders

In another aspect, the present technology provides a composition that includes a polymeric binder resin, an ether amine of formula I as described herein, and water, wherein the polymeric binder resin comprises acid functional groups, at least a portion of which are neutralized by the ether amine such that the polymeric binder resin is dissolved or dispersed in the water, provided that the polymeric binder resin is not a polyurethane. In some embodiments, the polymeric binder resin is selected from the group consisting of acrylic polymers, vinyl-acrylic copolymers, acrylic-vinyl versatate copolymers, styrene-acrylic copolymers, vinyl acetate ethylene copolymers, and mixtures of two or more thereof. In some embodiments, the polymeric binder resin include styrene-acrylic copolymers.

In some embodiments, the composition may include about 10 wt % to about 70 wt % of the polymeric binder, based on the total weight of the composition. For example, the composition may include about 20 wt % to about 65 wt %, about 25 wt % to about 60 wt %, or about 30 wt % to about 50 wt % polymeric binder. In some embodiments, the composition may include have a solids content of about 10 wt % to about 85 wt %, based on the total weight of the composition. For example, the composition may have a solids content of about 25 wt % to about 80 wt % or about 35 wt % to about 75 wt %.

In some embodiments, the binder may be a latex binder. In some embodiments, the latex binder may include polymerized monomers of acrylic acid or esters thereof, (meth)acrylic acid or esters thereof, vinyl acetate, styrene, vinyl versatate, olefin based material, or mixtures of two or more thereof. For example, latex binders may be prepared by free radical initiated aqueous emulsion polymerization of a monomer mixture containing acrylic acid or esters thereof (e.g., methyl acrylate, ethyl acrylate, butyl acrylate and/or 2-ethylhexylacrylate), methacrylic acid or esters thereof (e.g., methyl methacrylate, isobornyl methacrylate, butyl methacrylate), vinyl acetate, vinyl versatate such as Veova-10, 9 and EH from Hexion, styrene, and/or acrylonitrile and ethylene type monomers. In some embodiments, the binder may include a polyacrylate, polyvinyl versatate, and/or polyethylene-vinyl acetate. The polyacrylate may be a homopolymer or a copolymer. As used herein, polyacrylate includes polyalkylacrylates (e.g., poly(meth)acrylate). Exemplary copolymers of polyacrylate include polyvinyl acrylate, polyvinyl versatate-acrylate, polystyrenyl acrylate, or a combination of two or more thereof. Optionally, the polymeric binder may further contain functional monomers such as glycidyl methacrylate, diacetone acrylamide, or acetoacetoxyethyl (meth)acrylate and corresponding cross-linking agents, etc. to effect a crosslinking reaction during or after film formation to further enhance the film performance.

In some embodiments, the composition may further include one or more additional ingredients/additives described herein including, but not limited to, one or more pigments, leveling agents, surfactants, thickeners, rheology modifiers, co-solvents, corrosion inhibitors, defoamers, co-dispersants, additional neutralizer(s), and biocides.

In some embodiments, the composition may include the amount of water as described herein. In some embodiments, the composition may include at least about 20 wt % water, based on the total weight of the composition. For example, the composition may include about 30 wt % to about 70 wt % water, about 35 wt % to about 60 wt %, or about 40 wt % to about 50 wt % water. In some embodiments, the binder may be dissolved in water. In other embodiments, the binder may be dispersed in water.

In some embodiments, the composition may include a cosolvent such as an organic solvent as described herein. Cosolvents may originate from the preparation of the binders or may be added separately. Examples of suitable solvents are monohydric or polyhydric alcohols (e.g., methanol, ethanol, propanol including isopropanol, butanol, hexanol); glycol ethers or esters (e.g., diethylene glycol dialkyl ether, dipropylene glycol dialkyl ether, each with $C_1$-$C_6$ alkyl, ethoxypropanol, butyl glycol); glycols (e.g., ethylene glycol, propylene glycol), and ketones (e.g., methyl ethyl ketone, acetone, cyclohexanone); N-methylpyrrolidone, N-ethylpyrrolidone, aromatic or aliphatic hydrocarbons (e.g., toluene, xylene, or straight-chain or branched aliphatic $C_6$-$C_{12}$ hydrocarbons), or combinations thereof. Water-miscible organic solvents are preferred. In some embodiments, the cosolvent may be propyleneglycol-monopropylether. In some embodiments, the compositions may include no more than about 10 wt % cosolvent, based on total composition. For example, the compositions may include no more than about 5 wt % cosolvent.

In some embodiments, the composition may be substantially free of ammonia ($NH_3$). In some embodiments, the composition does not contain ammonia ($NH_3$). In some embodiments, an inorganic base may be included in the composition as a co-neutralizer with the compound of formula I. An example of a suitable base is a hydroxide such as NaOH.

In some embodiments, the composition may be physically coalesced at temperatures of at least about 0° C. (e.g., about 0° C. to about 200° C.). In some embodiments, the temperatures may be at least about 10° C. (e.g., about 10° C. to about 100° C.). In some embodiments, the temperatures may be at least about 15° C. (e.g., about 15° C. to about 50° C.). For example, the composition may be physically coalesced at about room temperature. The present technology also provides a method that includes drying and coalescing the composition at such temperatures.

In another aspect, the present technology provides a coating that includes the physically coalesced composition.

The ether amine compounds of formula I may be readily prepared. An example of a typical procedure is shown in Scheme I in which methoxypropylamine (MOPA) may be reacted with formaldehyde and hydrogen with Raney Nickel as the catalyst to form N,N-dimethylmethoxypropylamine (DMMOPA).

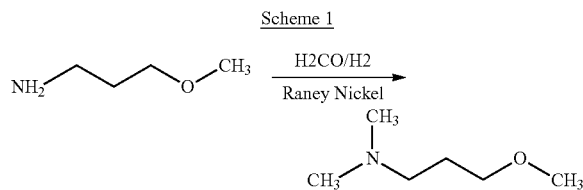

Scheme 1

The compositions described herein may be manufactured by conventional paint and coating manufacturing techniques, which are well known to those skilled in the art. Typically, the compositions are manufactured by a two-step process. First, a dispersion phase, commonly referred to as the grind phase, is prepared by mixing the dry pigments with other grind phase components, including most other solid powder formulation materials, under high shear agitation to provide a high viscosity and high solids mixture. This part of the process is designed to effectively wet and disagglomerate the dry pigments to a finely dispersed state.

The second step of the paint/coating manufacturing process is commonly referred to as the letdown or thindown phase, because the viscous grind is diluted with the remaining formulation components, which are generally less viscous than the grind mix. Typically, the binder, any predispersed pigments, and any other paint/coating ingredients that only require mixing and perhaps moderate shear, are incorporated during the letdown phase. The letdown phase may be done either by sequentially adding the letdown components into a vessel containing the grind mix, or by adding the grind mix into a vessel containing a premix of the binder and other letdown components, followed by sequential addition of the final letdown components. In either case, constant agitation is needed, although application of high shear is not required. For a clear coating without pigments, the grinding step may be excluded.

The ether amine compounds of formula I may be added to the composition at one or more of three different places in the manufacturing process: to the pigment dispersion (grinding), to the binder dispersion (letdown), and/or in a final addition to the composition.

In another aspect the present technology contemplates a process for preparing a coating layer, which includes:

1) applying a coating layer from a composition provided herein, and 2) curing and/or drying/coalescing the coating layer. Optionally, the applied coating layer may be flashed off to remove water and organic solvent, if present.

Unless otherwise indicated, numeric ranges, for instance as in "from 2 to 10," are inclusive of the numbers defining the range (e.g., 2 and 10).

Unless otherwise indicated, ratios, percentages, parts, and the like are by weight.

EXAMPLES

The examples herein are provided to illustrate advantages of the present technology and to further assist a person of ordinary skill in the art with preparing or using the compositions of the present technology. The examples herein are also presented in order to more fully illustrate the preferred aspects of the present technology. The examples should in no way be construed as limiting the scope of the present technology, as defined by the appended claims. The examples can include or incorporate any of the variations, aspects or aspects of the present technology described above. The variations, aspects or aspects described above may also further each include or incorporate the variations of any or all other variations, aspects or aspects of the present technology.

Testing Methods:

Solvent Resistance—Double Rubs: solvent resistance was measured using ASTM D5402 with methyl ethyl ketone as the rub solvent. The number of double rubs is recorded when degradation or delamination of the film is observed.

Pencil Hardness: Pencil hardness is a method for evaluating scratch resistance which uses pencil leads with different degrees of hardness and is measured according to ASTM D3363.

Pendulum Hardness: The test is measured according to ASTM D4366. The change in film hardness of the coating was measured with respect to time by using a Gardner hardness tester supplied by BYK Instruments. The number of oscillations was recorded.

Cross-Hatch Adhesion: The composition is coated onto a cold rolled steel (CRS) panel and dried for 7 days followed by cross-hatch. The test is measured according to ASTM D3359.

Scrub Resistance: The composition is dried for 7 days prior to the scrubbing. The test is measured according to ASTM D4213-08.

Blistering: The test is measured according to ASTM D714-02 (2017).

Corrosion Resistance: The composition is coated onto a CRS at a thickness of 1.2 mil and dried at room temperature for 7 days, and then scribed and soaked in 5% sodium chloride salt water for 72 hours.

Example 1: Cymel® 303 Amino Cured Polyacrylate Binder Compositions with an Ether Amine of Formula I or DMEA (Control) Neutralizer and p-TSA Water-based amino binder curing compositions were manufactured by first mixing a hydroxyl-functional polyacrylate (Paraloid WR-97) with DMMOPA or DMEA (control) in a stainless steel beaker (Table 1A). While agitated at high speeds with cowles blade, titanium dioxide was slowly added to disperse the pigment to a Hegman 7. Deionized water was added to the mixture to manage the viscosity. The agitation was then slowed to mixing speed and melamine resin (Cymel® 303) and approximately 0.6 wt % p-TSA were added. Deionized water was added to adjust the solids and viscosity of the compositions. The compositions were separately applied to electrodeposition coated cold rolled steel panels at a dry film thickness of 0.8 mil. The coatings were dried at room temperature for 30 minutes before curing for 30 minutes at 110° C., 120° C., and 130° C. The chemically cured coatings were tested for pendulum hardness, pencil hardness, and solvent resistance (Table 1B).

TABLE 1A

Cymel ® 303 Amino Cured Polyacrylate Binder Compositions with an Ether amine of Formula I or DMEA

|  | Control (wt %) | Ether Amine (wt %) |
|---|---|---|
| Grind | | |
| PARALOID WR-97 (as supplied) | 26.63 | 26.65 |
| Dimethyl aminoethanol, 50% | 1.62 | |
| DMMOPA, 70% | | 1.56 |
| Ti-Pure R706 | 18.69 | 18.70 |
| water | 1.56 | 1.56 |
| Letdown | | |
| Cymel 303LF | 4.67 | 4.67 |
| pTSA, 40% neutralized | 0.35 | 0.35 |
| Water | 46.49 | 46.52 |
| Total | 100.00 | 100.00 |
| Solids, % | 42.14 | 42.15 |
| pH | 7.86 | 7.90 |
| viscosity, cP | 880 | 580 |

Paraloid WR-97 is a water reducible acrylic polyol resin supplied by Dow Chemical.
TiPure R706 is a titanium dioxide pigment supplied by Chemours.
Cymel 303LF is a fully methylated melamine formaldehyde resin supplied by Allnex.
pTSA 40% neutralized is para-Toluenesulfonic acid which was neutralized with respective amine at 1:1.1 mole ratio and 40 wt % concentration in water.

TABLE 1B

Properties of Cymel ® 303 Amino Cured Polyacrylate Binder Compositions with an Ether amine of Formula I or DMEA (control) and catalyzed with p-TSA

| Curing Temp ° C. | Amine Neutralizers | Pendulum Hardness | Pencil Hardness | Solvent Resistance (MEK rubs) |
|---|---|---|---|---|
| 110° C. | DMEA | 60 | B | 8 |
|  | DMMOPA | 66 | B | 40 |
| 120° C. | DMEA | 72 | B | 55 |
|  | DMMOPA | 102 | HB | 300 |
| 130° C. | DMEA | 89 | F | >300 |
|  | DMMOPA | 101 | F | >300 |

Example 1 demonstrates that polyacrylate binder coatings neutralized with an ether amine of Formula I (DMMOPA) had improved curing properties compared to a coating neutralized with DMEA as evidenced by the improved solvent resistance and improved pendulum hardness while retaining similar pencil hardness.

Example 2: Cymel® 325 Amino Cured Polyacrylate Binder Compositions with an Ether Amine of Formula I or DMEA (Control) Neutralizer and No Catalyst Amino cured polyacrylate binder compositions were manufactured following the procedure in Example 1 except no catalyst was added and Cymel 303 was substituted with Cymel 325 (Table 2A). The coatings were dried at room temperature for 30 minutes before curing for 30 minutes at 90° C., 95° C., and 100° C. The chemically cured coatings were tested for pendulum hardness, pencil hardness, and solvent resistance (Table 2B).

TABLE 2A

Cymel ® 325 Amino Cured Polyacrylate Binder Compositions with an Ether amine of Formula I or DMEA and no catalyst

|  | Control (wt %) | Ether Amine (wt %) |
|---|---|---|
| Grind | | |
| PARALOID WR-97 (as supplied) | 27.77 | 27.73 |
| Dimethylaminoethanol, 50% | 1.62 | |
| DMMOPA, 70% | | 1.74 |
| Ti-Pure R706 | 19.49 | 19.46 |
| water | 1.62 | 1.62 |
| Letdown | | |
| Cymel 325 | 4.87 | 4.87 |
| pTSA, 40% neutralized | 0 | 0 |
| Water | 44.63 | 44.57 |
| Total | 100.00 | 100.00 |
| Solids, % | 43.80 | 43.74 |
| pH | 7.93 | 7.94 |
| viscosity, cP | 760.00 | 530 |

Cymel 325 is a partially methylated melamine formaldehyde resin supplied by Allnex

TABLE 2B

Properties of Cymel ® 325 Amino Cured Polyacrylate Binder Compositions with an Ether amine of Formula I or DMEA (control) and no catalyst

| Curing Temp ° C. | Amine Neutralizers | Pendulum Hardness | Pencil Hardness | Solvent Resistance (MEK rubs) |
|---|---|---|---|---|
| 90 | DMEA | 89 | B | 4 |
|  | DMMOPA | 96 | B | 4 |
| 95 | DMEA | 100 | B | 56 |
|  | DMMOPA | 98 | HB | 216 |
| 100 | DMEA | 112 | F | 180 |
|  | DMMOPA | 106 | F | 300 |

Example 2 demonstrates that polyacrylate binder coatings without a catalyst and neutralized with an ether amine of Formula I (DMMOPA) had improved curing properties compared to a coating neutralized with DMEA as evidenced by the improved solvent resistance and while retaining similar pencil and pendulum hardness.

Example 3: Cymel® 303 Amino Cured Polyester Binder Compositions with an Ether Amine of Formula I or DMEA (Control) Neutralizer and p-TSA Amino cured binder compositions were manufactured following the procedure in Example 1, but Paraloid WR-97 was substituted with Polymac WR72-7203 (Table 3A). The coatings were dried at room temperature for 30 minutes before curing at 125° C., 130° C., and 135° C. The chemically cured coatings were tested for pendulum hardness, pencil hardness, and solvent resistance (Table 3B).

TABLE 3A

Cymel ® 303 Amino Cured Polyester Binder Compositions with an Ether amine of Formula I or DMEA (control) and catalyzed with p-TSA

|  | Control (wt %) | Ether Amine (wt %) |
|---|---|---|
| Grind | | |
| Polymac WR 72-7203 (as supplied) | 27.00 | 26.97 |
| Ti-Pure R706 | 25.09 | 25.06 |
| Dimethylaminoethanol, 50% | 4.04 | |
| DMMOPA, 70% | | 3.99 |
| Letdown | | |
| Water (deionized) | 14.25 | 12.48 |
| Cymel 303LF | 5.00 | 4.97 |
| BYK 333 surfactant | 0.16 | 0.15 |
| Water (deionized) | 24.09 | 25.98 |
| pTSA, 40% neutralized | 0.39 | 0.40 |
| | | |
| Total | 100.00 | 100.00 |
| Solids, % | 50.29 | 50.21 |
| pH | 8.34 | 8.40 |
| viscosity, cP | 1200 | 1460 |

Polymac WR72-7203 is a water reducible polyester polyol resin supplied by Polynt BYK 333 is a wetting agent provided by BYK

TABLE 3B

Properties of Cymel ® 303 Amino Cured Polyester Binder Compositions with an Ether amine of Formula I or DMEA (control) and catalyzed with p-TSA

| Curing Temp °C. | Amine neutralizer | pendulum hardness | pencil hardness | solvent resistance (MEK rubs) |
|---|---|---|---|---|
| 125° C. | DMEA | 30 | 2B | 31 |
|  | DMMOPA | 49 | 2B | 105 |
| 130° C. | DMEA | — | 2B | 88 |
|  | DMMOPA | — | HB | >500 |
| 135° C. | DMEA | 75 | B | >500 |
|  | DMMOPA | 90 | F | >500 |

Example 3 demonstrates that polyester binder coatings neutralized with an ether amine of Formula I (DMMOPA) had improved curing properties compared to a coating neutralized with DMEA as evidenced by the improved solvent resistance and improved pendulum hardness while retaining similar pencil hardness.

Example 4: Cymel® 303 Amino Cured Polyester Binder Compositions with an Ether Amine of Formula I or DMEA (Control) Neutralizer and No Catalyst Amino cured binder compositions were manufactured following the procedure in Example 3, but without p-TSA catalyst (Table 4A). The coatings were dried at room temperature for 30 minutes before curing at 125° C., 130° C., and 135° C. The chemically cured coatings were tested for pendulum hardness, pencil hardness, and solvent resistance (Table 4B).

TABLE 4A

Cymel ® 303 Amino Cured Polyester Binder Compositions with an Ether amine of Formula I or DMEA (control) and no catalyst

|  | Control (wt %) | Ether Amine (wt %) |
|---|---|---|
| Grind | | |
| Polymac WR 72-7203 (as supplied) | 27.01 | 26.91 |
| Ti-Pure R706 | 25.12 | 24.98 |
| Dimethylaminoethanol, 50% | 3.98 | |
| DMMOPA, 70% | | 3.94 |
| Letdown | | |
| Water (deionized) | 14.22 | 12.49 |
| Cymel 303LF | 4.99 | 4.98 |
| BYK 333 surfactant | 0.15 | 0.15 |
| Water (deionized) | 24.53 | 26.56 |
| | | |
| Total | 100.00 | 100.00 |
| Solids, % | 50.29 | 50.21 |
| pH | 8.34 | 8.40 |
| viscosity, cP | 1200 | 1460 |

TABLE 4B

Properties of Cymel ® 303 Amino Cured Polyester Binder Compositions with an Ether amine of Formula I or DMEA (control) and no catalyst

| Curing Temp °C. | Amine neutralizer | pendulum hardness | pencil hardness | solvent resistance (MEK rubs) |
|---|---|---|---|---|
| 125° C. | DMEA | 30 | 2B | 31 |
|  | DMMOPA | 49 | 2B | 105 |
| 130° C. | DMEA | — | 2B | 88 |
|  | DMMOPA | — | HR | >500 |
| 135° C. | DMEA | 75 | B | >500 |
|  | DMMOPA | 90 | F | >500 |

Example 4 demonstrates that polyester binder coatings without a catalyst and neutralized with an ether amine of Formula I (DMMOPA) had improved curing properties compared to a coating neutralized with DMEA as evidenced by the improved solvent resistance and improved pendulum hardness while retaining similar pencil hardness.

Example 5: Cymel® 325 Amino Cured Polyester Binder Compositions with an Ether Amine or DMEA (Control) Neutralizer and No Catalyst Amino cured binder compositions were manufactured following the procedure in Example 4, but Cymel® 303 was substituted with Cymel® 325 (Table 5A). The coatings were dried at room temperature for 30 minutes before curing at 90° C., 95° C., 100° C., and 110° C. The chemically cured coatings were tested for pendulum hardness, pencil hardness, and solvent resistance (Table 5B).

TABLE 5A

Cymel® 325 Amino Cured Polyester Binder Compositions with an Ether amine of Formula I or DMEA (control) and no catalyst

| | Control (wt %) | Ether Amine (wt %) |
|---|---|---|
| Grind | | |
| Polymac WR 72-7203 (as supplied) | 27.03 | 26.95 |
| Ti-Pure R706 | 25.12 | 25.01 |
| Dimethylaminoethanol, 50% | 3.82 | |
| DMMOPA, 70% | | 3.52 |
| Letdown | | |
| Water (deionized) | 14.24 | 12.50 |
| Cymel 325 | 6.14 | 6.09 |
| BYK 333 surfactant | 0.40 | 0.41 |
| Water (deionized) | 23.04 | 25.09 |
| dimethylaminoethanol, 50% | 0.21 | |
| DMMOPA, 70% | | 0.43 |
| Total | 100.00 | 100.00 |
| Solids, % | 50.36 | 50.15 |
| pH | 8.29 | 8.36 |
| viscosity, cP | 815 | 1030 |

TABLE 5B

Properties of Cymel® 325 Amino Cured Polyester Binder Compositions with an Ether amine of Formula I or DMEA (control) and no catalyst

| Curing Temp °C. | Amine neutralizers | pendulum hardness | pencil hardness | solvent resistance (MEK rubs) |
|---|---|---|---|---|
| 120° C. | DMEA | 77 | B | 121 |
| | DMMOPA | 75 | HB | 224 |
| 125° C. | DMEA | 78 | B | 214 |
| | DMMOPA | 79 | HB | 441 |
| 130° C. | DMEA | 92 | B | 428 |
| | DMMOPA | 92 | F | >500 |

Example 5 demonstrates that polyester binder coatings without a catalyst and neutralized with an ether amine of Formula I (DMMOPA) had improved curing properties compared to a coating neutralized with DMEA as evidenced by the improved solvent resistance while retaining similar pencil and pendulum hardness. Similar curing properties improvements were observed when polyester polyol was used as the binder resin.

Example 6: Latex Binder Compositions with an Ether Amine, Ammonia (Control), or DMAMP (Control) Neutralizer Latex binder compositions were manufactured by first forming the grind phase by mixing water with a neutralizer using a cowles blade. The wetting agents, defoamer, dispersants and rheology modifier were then added sequentially and mixed for 15 minutes. Titanium dioxide was then slowly added and agitation speed was increased to high. The pigment was dispersed to a Hegman 7. Water was added when needed during the mixing to manage viscosity. The letdown phase was then formed by slowing the mixing speed and adding the styrene-acrylic latex polymer and additional formulation ingredients in the letdown phase. Water was added to adjust solids and viscosity. The materials and weight percent for the compositions are provided in Table 6A.

TABLE 6A

Latex Binder Compositions with an Ether amine of Formula I, Ammonia (control), or DMAMP (control)

| Materials | Function | Control ($NH_3$) (parts) | Ether Amine (parts) | Control (DMAMP) (parts) |
|---|---|---|---|---|
| Grind | | | | |
| Water | diluent | 60.00 | 56.22 | 57.00 |
| Ammonia, 28% | neutralizer | 2.00 | | |
| DMMOPA, 70% | neutralizer | | 5.78 | |
| DMAMP-80, 80% | neutralizer | | | 4.83 |
| Surfynol 104PG50 | wetting agent | 4.00 | 4.00 | 4.00 |
| BYK 028 | defoamer | 4.00 | 4.00 | 4.00 |
| Disperbyk 190 | dispersant | 9.00 | 9.00 | 9.00 |
| TiPure R-706 | $TiO_2$, 0.36 μm | 155.00 | 155.00 | 155.00 |
| Acrysol RM-2020 | rheology modifier | 3.00 | 3.00 | 3.00 |
| Letdown | | | | |
| RayKote 2010 | styrene acrylic latex | 555.30 | 555.30 | 555.30 |
| Proxel AQ | preservative | 4.00 | 4.00 | 4.00 |
| Water | diluent | 126.00 | 126.00 | 126.00 |
| Dowanol DPnB | coalescent | 27.77 | 27.77 | 27.77 |
| Halox 570 (30% $H_2O$) | flash rust/corrosion | 10.00 | 10.00 | 10.00 |
| Acrysol RM-2020 | rheology modifier | 7.50 | 7.50 | 7.50 |
| Acrysol RM-8W | rheology modifier | 5.50 | 5.50 | 5.50 |
| Total | grind + letdown | 973.07 | 973.07 | 972.90 |

TABLE 6B

Properties of Latex Binder Compositions with an Ether amine of Formula I, Ammonia (control), or DMAMP (control)

| Amine Neutralizer | Ammonia | DMAMP | DMMOPA |
|---|---|---|---|
| 2 h water soak | | | |
| blister rating | 10 | 9, few | 10 |
| gloss change | none | slight | none |
| 4 h water soak | | | |
| blister rating | 9, few | 8, medium | 9, few |
| gloss change | moderate | moderate | v. slight |

10 = no blisters
Lower number = larger blister size

Example 6 demonstrates that latex binder compositions with DMMOPA and ammonia had improved water resistance compared to DMAMP, which showed blistering and gloss reduction after extended water soaking.

Figure 1B:
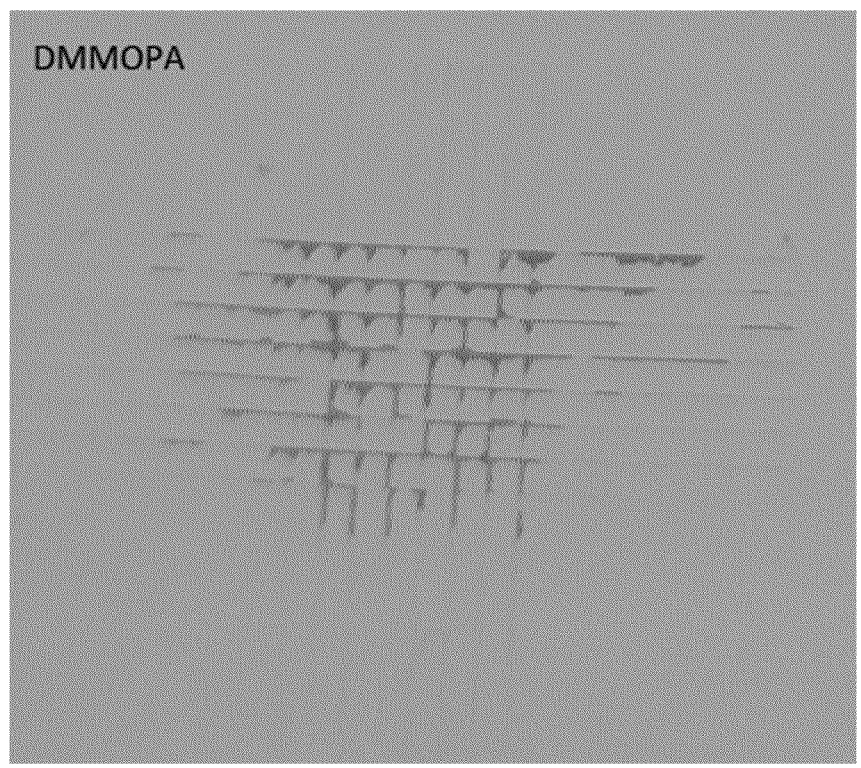
Figure 1C:
Figure 2:
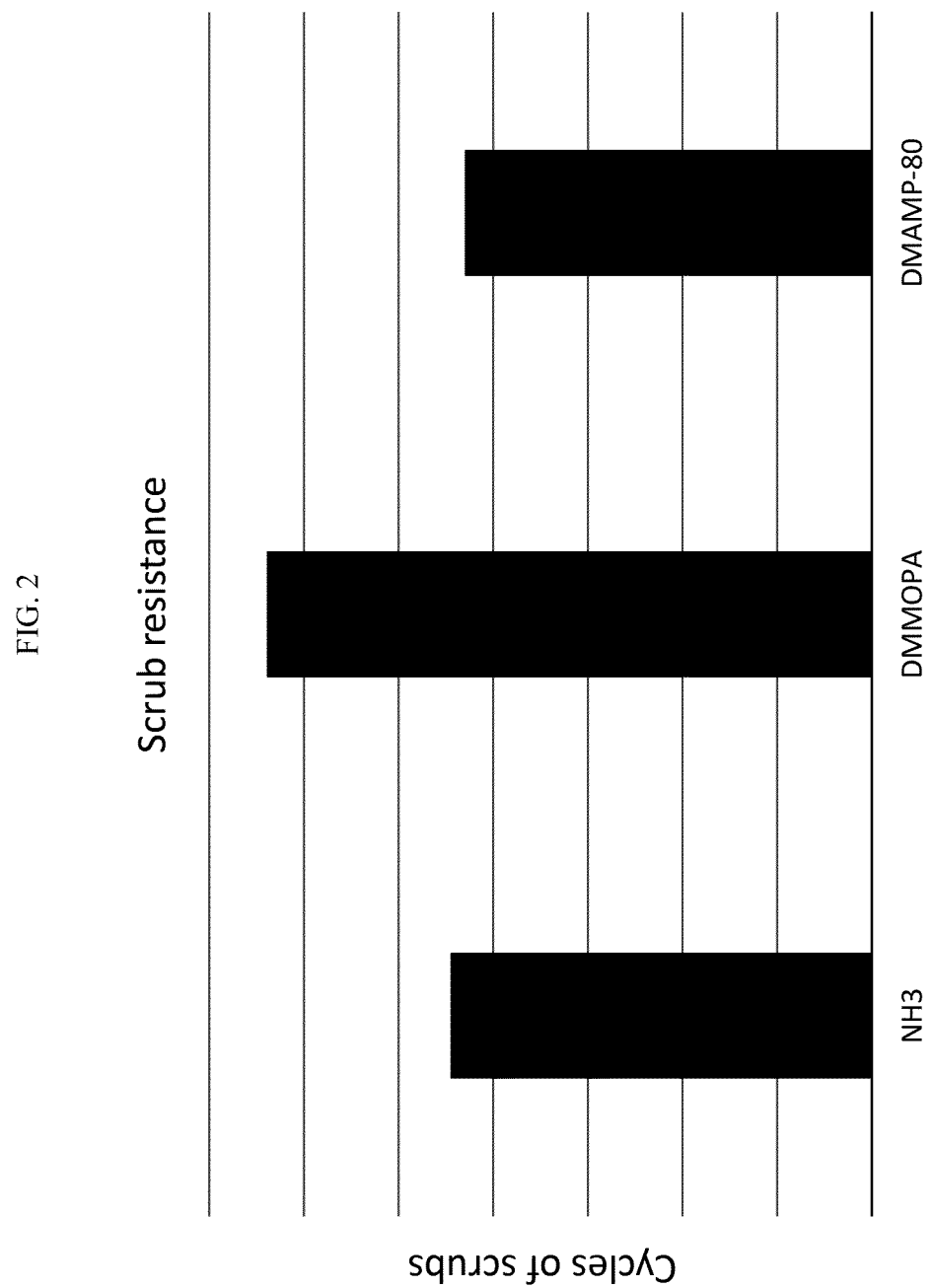
FIG. 2 provides the scrub resistance test result of latex binder compositions with the neutralizer ammonia, DMMOPA, or DMAMP.
Figure 3A:
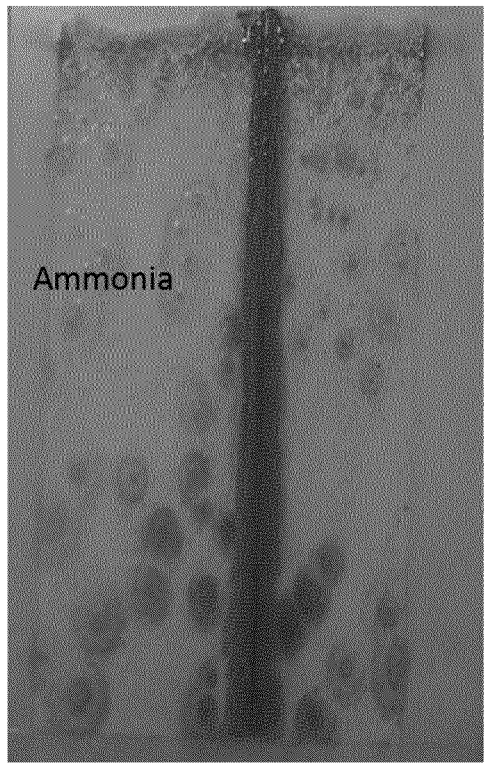
FIGS. 3A-3C provides the corrosion resistance test result of latex binder compositions with the neutralizer ammonia (FIG. 3A), DMMOPA (FIG. 3B), or DMAMP (FIG. 3C).
Figure 3B:
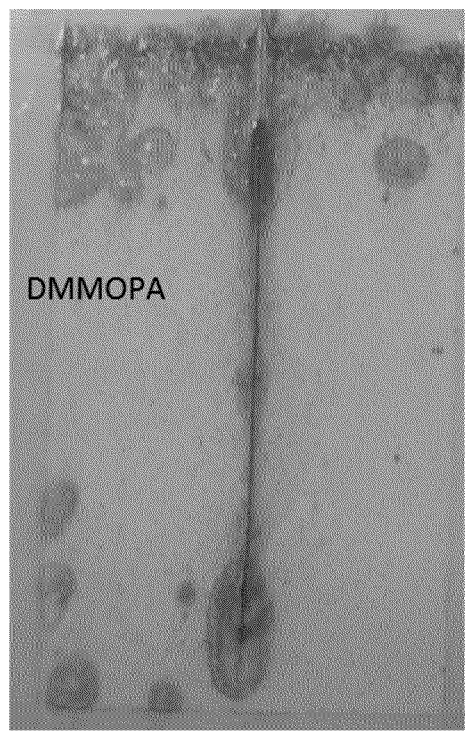
Figure 3C:
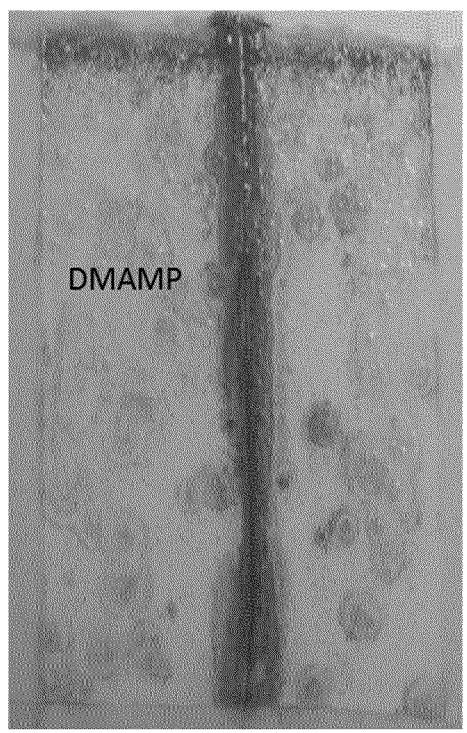

FIGS. 1A-1C demonstrate that latex binder compositions neutralized with ammonia (FIG. 1A) and DMMOPA (FIG. 1B) had much better adhesion rated at 3B compared to DMAMP (FIG. 1C), which had poor adhesion rated at 0B. FIG. 2 demonstrates that latex binder compositions neutralized with DMAMP and ammonia have similar scrub resistance, whereas latex binder compositions neutralized with DMMOPA have significant improved scrub resistance (greater than 40% improvement). FIGS. 3A-3C demonstrate that latex binder compositions neutralized with DMMOPA (FIG. 3B) have improved corrosion resistance compared to ammonia (FIG. 3A) and DMAMP (FIG. 3C).

Example 7: Alkyd Binder Compositions with an Ether Amine, Ammonium Hydroxide (Control), or DMEA (Control) Neutralizer The grind phase for alkyd binder compositions included first mixing with a cowles blade the water reducible alkyd polymer (Seta 41-1390) with a neutralizer. The solvents, defoamer, accelerator, and drier were then added sequential and mixed for 15 minutes. Titanium dioxide was then slowly added and agitation speed was increased to high. The pigment was dispersed to a Hegman 7. Water was added during the mixing to manage viscosity. The letdown phase included slowing the mixing speed and adding additional alkyd polymer, a neutralizer, solvents, and a corrosion inhibitor. Water was added to adjust solids and viscosity. The materials and weight percent for the compositions are provided in Table 7A.

TABLE 7A

Alkyd Binder Compositions with an Ether amine of formula I, Ammonium hydroxide (control), or DMEA (control)

| Materials | Function | Ether amine (wt %) | Control A (wt %) | Control B (wt %) |
|---|---|---|---|---|
| GRIND | | | | |
| Setal 41-1390 | Water reducible alkyd | 19.2 | 19.2 | 19.2 |
| Ammonium hydroxide | Neutralizing amine | | 0.8 | |
| DMMOPA | Neutralizing amine | 2 | | |
| DMEA | Neutralizing amine | | | 1.5 |
| N-Butanol | Solvent | 0.5 | 0.5 | 0.5 |
| 2-Butoxyethanol | Solvent | 0.5 | 0.5 | 0.5 |
| BYK 020 | Defoamer | 0.3 | 0.3 | 0.3 |
| Active 8 | Accelerator | 0.1 | 0.1 | 0.1 |
| 5% Cobalt Drier | Drier | 0.6 | 0.6 | 0.6 |
| Titanox R-960 | White Pigment | 19 | 19 | 19 |
| DI Water | | 17.4 | 17.4 | 17.4 |
| Grind to 7+ NS | | | | |
| Letdown | | | | |
| Setal 41-1390 | Water reducible alkyd | 9.1 | 9.1 | 9.1 |
| Ammonium hydroxide | Neutralizing amine | | 0.8 | |
| DMMOPA | Neutralizing amine | 2 | | |
| N-Butanol | Solvent | 0.6 | 0.6 | 0.6 |
| 2-Butoxyethanol | Solvent | 1.7 | 1.7 | 1.7 |
| DI Water | | 29.3 | 29.3 | 29.3 |
| NACORR 1389 | Corrosion inhibitor | 2 | 2 | 2 |
| Total | | 104.3 | 101.9 | 101.8 |

EQUIVALENTS

While certain embodiments have been illustrated and described, a person with ordinary skill in the art, after reading the foregoing specification, can effect changes, substitutions of equivalents and other types of alterations to the compositions of the present technology as set forth herein. Each aspect and embodiment described above can also have included or incorporated therewith such variations or aspects as disclosed in regard to any or all of the other aspects and embodiments.

The present technology is also not to be limited in terms of the particular aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to particular methods, reagents, compounds, or compositions, which can, of course, vary. It is also to be understood that the terminology used herein is for the purpose of describing particular aspects only, and is not intended to be limiting. Thus, it is intended that the specification be considered as exemplary only with the breadth, scope and spirit of the present technology indicated only by the appended claims, definitions therein and any equivalents thereof.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the technology. This includes the generic description of the technology with a proviso or negative limitation removing any subject matter from the genus, regardless of whether or not the excised material is specifically recited herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims, along with the full scope of equivalents to which such claims are entitled.

What is claimed is:

1. A composition comprising a polymeric binder resin, an ether amine, and water, wherein
   the polymeric binder resin comprises acid functional groups, at least a portion of which are neutralized by the ether amine such that the polymeric binder resin is dispersed in the water, provided that the polymeric binder resin is not a polyurethane; and
   the ether amine is a compound of formula I:

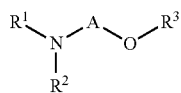

Formula I wherein:
   $R^1$ and $R^2$ are independently $C_1$-$C_4$ alkyl or $C_3$-$C_4$ cycloalkyl group; or $R^1$ and $R^2$, together with the nitrogen to which they are attached, form a $C_4$-$C_5$ membered heterocycloalkyl ring;
   A is a $C_2$-$C_6$ alkylene or $C_3$-$C_6$ cycloalkylene ring; and $R^3$ is $C_1$-$C_4$ alkyl or $C_3$-$C_4$ cycloalkyl group;
   provided that the compound of formula I contains no more than 10 carbons.

2. The composition of claim 1, wherein $R^1$ and $R^2$ are independently a $C_1$-$C_4$ alkyl group.

3. The composition of claim 1, wherein $R_1$ and $R_2$ are the same.

4. The composition of claim 1, wherein $R^3$ is a $C_1$-$C_4$ alkyl group.

5. The composition of claim 1, wherein A is a $C_2$-$C_6$ alkylene group.

6. The composition of claim 1, wherein the ether amine is N,N-dimethylmethoxyethylamine (DMMOEA) or N,N-dimethylmethoxypropylamine (DMMOPA).

7. The composition of claim 1, wherein the composition comprises about 0.1 wt % to about 10 wt % of the ether amine based on the total composition, about 10 wt % to about 80 wt % polymeric binder resin based on the total composition, or a combination thereof.

8. The composition of claim 1, wherein the polymeric binder resin further comprises curable functional groups selected from hydroxyl, thiol, and amino groups.

9. The composition of claim 1, wherein the polymeric binder resin is substantially free of curable functional groups selected from the group consisting of hydroxyl, thiol, and amino.

10. The composition of claim 8 further comprising an amino cross-linking agent.

11. The composition of claim 10, wherein the amino cross-linking agent comprises an amino resin.

12. A coating comprising the chemically cured composition of claim 10.

13. A method comprising curing the composition of claim 10 at a temperature of about 80° C. to about 300° C.

14. The composition of claim 8, wherein the polymer binder resin comprises a polyester with one or more olefins and the composition further comprises a metallic drier.

15. The composition of claim 9, wherein the polymeric binder resin is a polyester comprising the reaction product of a polyol, an unsaturated polycarboxylic acid, saturated polycarboxylic acid, and a metallic drier.

16. A coating comprising the chemically cured composition of claim 14.

17. A method comprising curing the composition of claim 14 at a temperature of about 0° C. to about 200° C.

18. The composition of claim 9, wherein the polymeric binder resin is selected from the group consisting of acrylic polymers, vinyl-acrylic copolymers, vinyl versatate-acrylate copolymers, styrene-acrylic copolymers, vinyl acetate ethylene copolymers, and mixtures of two or more thereof.

19. A coating comprising the dried and coalesced composition of claim 18.

20. A method comprising drying and coalescing the composition of claim 18 at a temperature of at least about 5° C.

* * * * *